US012750413B2

(12) United States Patent
Kemmochi et al.

(10) Patent No.: US 12,750,413 B2
(45) Date of Patent: Sep. 29, 2026

(54) DECODING APPARATUS, DECODING METHOD, ENCODING APPARATUS, AND ENCODING METHOD

(71) Applicant: SONY GROUP CORPORATION, Tokyo (JP)

(72) Inventors: Chisato Kemmochi, Tokyo (JP); Takafumi Hattori, Tokyo (JP); Ryuji Tokunaga, Tokyo (JP); Yasuhiro Toguri, Tokyo (JP); Akio Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 454 days.

(21) Appl. No.: 17/906,656

(22) PCT Filed: Mar. 17, 2021

(86) PCT No.: PCT/JP2021/010839
§ 371 (c)(1),
(2) Date: Sep. 19, 2022

(87) PCT Pub. No.: WO2021/200161
PCT Pub. Date: Oct. 7, 2021

(65) Prior Publication Data

US 2023/0133271 A1 May 4, 2023

(30) Foreign Application Priority Data

Mar. 31, 2020 (JP) ................................ 2020-064997

(51) Int. Cl.
*G10L 19/005* (2013.01)
*H04L 1/16* (2023.01)
(Continued)

(52) U.S. Cl.
CPC .......... *H04L 65/762* (2022.05); *G10L 19/005* (2013.01); *H04L 1/16* (2013.01); *H04L 65/70* (2022.05)

(58) Field of Classification Search
CPC ......... H04L 65/762; H04L 65/70; H04L 1/16; H04L 1/1819; G10L 19/005
See application file for complete search history.

(56) References Cited

U.S. PATENT DOCUMENTS 6,522,693 B1 * 2/2003 Lu ........................ H04N 19/149 375/E7.218
9,185,045 B1 * 11/2015 Yang ................ H04W 28/0289
(Continued)

FOREIGN PATENT DOCUMENTS

JP 2007-233457 A 9/2007
JP 2007-251737 A 9/2007
(Continued)

OTHER PUBLICATIONS

Buffer Mechanism (Year: 2009).*
(Continued)

*Primary Examiner* — Yemane Mesfin
*Assistant Examiner* — Guoxing Fan
(74) *Attorney, Agent, or Firm* — CHIP LAW GROUP

(57) ABSTRACT

Provided is a decoding apparatus that includes a reception unit, a first storage unit, a second storage unit, and a decoding unit. The reception unit receives a plurality of pieces of encoded data generated by encoding a plurality of pieces of frame data to be wirelessly transmitted, and identification information being assigned to each of the plurality of pieces of frame data. The first storage unit stores each of the received plurality of pieces of encoded data in a predetermined storage area. The second storage unit stores, on a basis of the identification information corresponding to
(Continued)

each of the plurality of pieces of encoded data, an address of the storage area of the first storage unit. The decoding unit reads the encoded data from the first storage unit on a basis of the stored address, and decodes the read encoded data.

15 Claims, 17 Drawing Sheets

(51) Int. Cl.
*H04L 65/70* (2022.01)
*H04L 65/75* (2022.01)

(56) References Cited

U.S. PATENT DOCUMENTS

| | | | | |
|---|---|---|---|---|
| 2007/0286279 | A1 * | 12/2007 | Hamanaka | H04N 21/85406 375/E7.181 |
| 2008/0126562 | A1 * | 5/2008 | Ludwig | H04L 1/1874 709/235 |
| 2008/0130534 | A1 * | 6/2008 | Tomioka | H04L 1/1819 370/310 |
| 2012/0069905 | A1 * | 3/2012 | Kato | H04N 19/196 375/E7.243 |
| 2013/0182645 | A1 * | 7/2013 | Raveendran | H04W 4/00 370/328 |
| 2013/0243086 | A1 * | 9/2013 | Ooi | H04N 19/172 375/240.12 |
| 2017/0257647 | A1 * | 9/2017 | Iguchi | H04N 21/631 |
| 2020/0204484 | A1 * | 6/2020 | Altman | H04L 47/125 |
| 2024/0106581 | A1 * | 3/2024 | Dong | H04W 28/0205 |

FOREIGN PATENT DOCUMENTS

| | | | |
|---|---|---|---|
| JP | 2016-515775 | A | 5/2016 |
| JP | 6540189 | B2 | 7/2019 |
| WO | 2016/051451 | A1 | 4/2016 |
| WO | 2019/064815 | A1 | 4/2019 |

OTHER PUBLICATIONS

International Search Report and Written Opinion of PCT Application No. PCT/JP2021/010839, issued on Jun. 22, 2021, 09 pages of ISRWO.

* cited by examiner

DECODING APPARATUS, DECODING METHOD, ENCODING APPARATUS, AND ENCODING METHOD

CROSS REFERENCE TO RELATED APPLICATIONS

This application is a U.S. National Phase of International Patent Application No. PCT/JP2021/010839 filed on Mar. 17, 2021, which claims priority benefit of Japanese Patent Application No. JP 2020-064997 filed in the Japan Patent Office on Mar. 31, 2020. Each of the above-referenced applications is hereby incorporated herein by reference in its entirety.

TECHNICAL FIELD

The present technology relates to a decoding apparatus, a decoding method, an encoding apparatus, and an encoding method that are applicable to data transmission and the like.

BACKGROUND ART

Patent Literature 1 discloses a transmission apparatus capable of wirelessly transmit audio data. In this transmission apparatus, the compression rate when generating encoded data is determined on the basis of the number of pieces of data standing by for transmission held in a standing-by-for-transmission buffer unit. As a result, it is possible to transmit encoded data to be played back so that the playing is not interrupted without estimating the communication quality (paragraphs [0009], [0019], and the like of the specification of Patent Literature 1).

CITATION LIST

Patent Literature

Patent Literature 1: Japanese Patent No. 6540189

DISCLOSURE OF INVENTION

Technical Problem

As described above, there is a demand for a technology for suppressing the transmission error of encoded data.

In view of the circumstances as described above, it is an object of the present technology to provide a decoding apparatus, a decoding method, an encoding apparatus, and an encoding method that are capable of suppressing the transmission error of encoded data.

Solution to Problem

In order to achieve the above-mentioned object, a decoding apparatus according to an embodiment of the present technology includes: a reception unit; a first storage unit; a second storage unit; and a decoding unit.

The reception unit receives a plurality of pieces of encoded data generated by encoding a plurality of pieces of frame data to be wirelessly transmitted, identification information being assigned to each of the plurality of pieces of frame data.

The first storage unit stores each of the received plurality of pieces of encoded data in a predetermined storage area.

The second storage unit stores, on the basis of the identification information corresponding to each of the plurality of pieces of encoded data, an address of the storage area of the first storage unit in which each of the plurality of pieces of encoded data is stored.

The decoding unit reads the encoded data from the first storage unit on the basis of the address stored in the second storage unit on the basis of the identification information, and decodes the read encoded data.

In this decoding apparatus, a plurality of pieces of encoded data generated by encoding a plurality of pieces of frame data is received, identification information being assigned to each of the plurality of pieces of frame data. The received encoded data is stored in a predetermined storage area of a first storage unit. An address of the storage area of the plurality of pieces of encoded data stored in the first storage unit is stored in a second storage unit on the basis of the identification information. A decoding unit reads the encoded data from the first storage unit on the basis of the address stored in the second storage unit, and decodes the read encoded data. This makes it possible to efficiently decode the received plurality of pieces of encoded data. Further, it is possible to cope with the re-encoding and re-transmission of the encoded data by the apparatus on the transmission side and suppress the transmission error of encoded data.

The plurality of pieces of frame data may be data obtained by content data to be played back into a plurality of pieces. In this case, the identification information may be information capable of identifying order of playing back the plurality of pieces of frame data. Further, the first storage unit may store the received plurality of pieces of encoded data in order of the reception. Further, the second storage unit may store, in order of playing back the plurality of pieces of frame data, the address of the storage area in which each of the plurality of pieces of encoded data is stored.

The reception unit may receive transmission encoded data that includes one or more pieces of encoded data and falls within a transmission-unit of the wireless transmission. In this case, the first storage unit may store each of the one or more pieces of encoded data included in the received transmission encoded data.

The decoding apparatus may further include: a detection unit; and a notification unit.

The detection unit detects, on the basis of the identification information, encoded data whose reception has failed.

The notification unit that notifies an apparatus that transmits the plurality of pieces of encoded data of information relating to the detected encoded data whose reception has failed.

The first storage unit may delete the encoded data decoded by the decoding unit. Further, the second storage unit may delete an address of the storage area in which the encoded data decoded by the decoding unit has been stored.

A decoding method according to an embodiment of the present technology is a decoding method executed by a computer system, including: a reception step; a first storage step; a second storage step; and a decoding step.

The reception step receives a plurality of pieces of encoded data generated by encoding a plurality of pieces of frame data to be wirelessly transmitted, identification information being assigned to each of the plurality of pieces of frame data.

The first storage step stores each of the received plurality of pieces of encoded data in a predetermined storage area of a first storage unit.

The second storage step stores, in a second storage unit on the basis of the identification information corresponding to each of the plurality of pieces of encoded data, an address of the storage area of the first storage unit in which each of the plurality of pieces of encoded data is stored.

The decoding step reads, on the basis of the address stored in the second storage unit on the basis of the identification information, the encoded data from the first storage unit, and decodes the read encoded data.

An encoding apparatus according to an embodiment of the present technology includes: an assigning unit; an encoding unit; and detection unit.

The assigning unit assigns identification information to each of a plurality of pieces of frame data to be wirelessly transmitted.

The encoding unit encodes each of the plurality of pieces of frame data to generate a plurality of pieces of encoded data.

The detection unit detects, as identification information for regeneration, the identification information corresponding to the encoded data that needs to be regenerated of the generated plurality of pieces of encoded data.

Further, the encoding unit re-encodes the frame data to which the detected identification information for regeneration has been assigned.

In this encoding apparatus, identification information is assigned to each of a plurality of pieces of frame data. Then, the identification information of the encoded data that needs to be regenerated is detected as identification information for regeneration, and frame data to which the identification information for regeneration has been assigned is re-encoded. As a result, it is possible to suppress the transmission error of encoded data.

The encoding unit may re-encode the frame data to which the identification information for regeneration has been assigned at a bit rate for re-encoding.

The encoding unit may set the bit rate for re-encoding on the basis of a transmission state of the wireless transmission.

The encoding apparatus may further include a transmission unit that wirelessly transmits the plurality of pieces of encoded data. In this case, the detection unit may detect, as the identification information for regeneration, the identification information corresponding to the encoded data whose wireless transmission by the transmission unit has failed.

The encoding apparatus may further include a transmission unit that wirelessly transmits the plurality of pieces of encoded data. In this case, the detection unit may detect, as the identification information for regeneration, the identification information corresponding to the encoded data discarded without being wirelessly transmitted.

The detection unit may detect the identification information for regeneration on the basis of notification from an apparatus that receives the plurality of pieces of encoded data.

The identification information of the encoded data whose reception has failed may be detected as the identification information for regeneration on the basis of the notification including information relating to the encoded data whose reception has failed from the apparatus that receives the plurality of pieces of encoded data.

The encoding unit may generate transmission encoded data that includes one or more pieces of encoded data and falls within a transmission-unit of the wireless transmission. In this case, the transmission unit may wirelessly transmit the transmission encoded data. Further, the detection unit may detect, as the identification information for regeneration, the identification information corresponding to each of the one or more pieces of encoded data included in the transmission encoded data whose wireless transmission by the transmission unit has failed.

The encoding unit may generate the transmission encoded data including re-encoded data and initially-encoded data, the re-encoded data being the encoded data generated by re-encoding by the encoding unit, the initially-encoded data being the encoded data generated by initial encoding by the encoding unit.

The encoding unit may generate the transmission encoded data such that the re-encoded data is preferentially wirelessly transmitted.

The plurality of pieces of frame data may be data obtained by content data to be played back into a plurality of pieces. In this case, the identification information may be information capable of identifying order of playing back the plurality of pieces of frame data. Further, the encoding unit may generate the transmission encoded data including a plurality of pieces of encoded data whose playback order is not continuous.

The encoding apparatus may further include: a storage unit; and an output control unit.

The storage unit stores the plurality of pieces of frame data.

The output control unit controls an output of the frame data stored in the storage unit to the encoding unit.

The output control unit may control an output of the frame data to the encoding unit such that the frame data to which the detected identification information has been assigned is output to the encoding unit, and delete, from the storage unit, the frame data corresponding to the encoded data whose wireless transmission by the transmission unit has succeeded.

An encoding method according to an embodiment of the present technology is an encoding method executed by a computer system, including: an assigning step; an encoding step; and a detection step.

The assigning step assigns identification information to each of a plurality of pieces of frame data to be wirelessly transmitted.

The encoding step encodes each of the plurality of pieces of frame data to generate a plurality of pieces of encoded data.

The detection step detects, as identification information for regeneration, the identification information corresponding to the encoded data that needs to be regenerated of the generated plurality of pieces of encoded data.

Further, the encoding step re-encodes the frame data to which the detected identification information for regeneration has been assigned.

MODE(S) FOR CARRYING OUT THE INVENTION

Hereinafter, an embodiment according to the present technology will be described with reference to the drawings.

[Data Transmission System]

Figure 1:
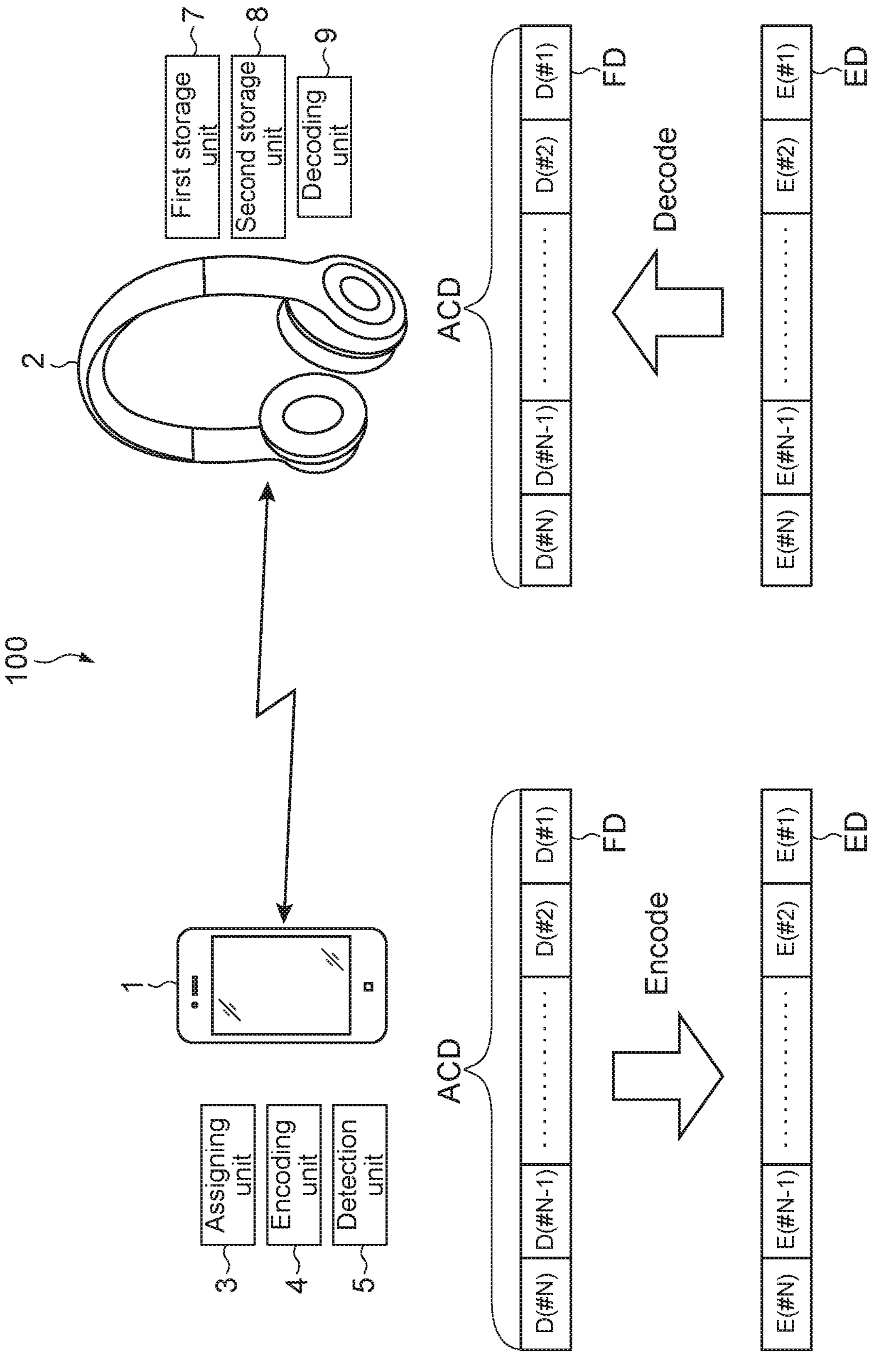
FIG. 1 is a schematic diagram for describing a data transmission system according to an embodiment of the present technology.

FIG. 1 is a schematic diagram for describing a data transmission system according to an embodiment of the present technology.

A data transmission system 100 includes a transmission apparatus 1 and a reception apparatus 2.

The transmission apparatus 1 encodes data to be transmitted and wirelessly transmits the encoded data.

The reception apparatus 2 receives the data transmitted by the transmission apparatus 1 and decodes the received data.

The transmission apparatus 1 shown in FIG. 1 corresponds to an embodiment of the encoding apparatus according to the present technology.

The reception apparatus 2 shown in FIG. 1 corresponds to an embodiment of the decoding apparatus according to the present technology.

The transmission apparatus 1 includes, for example, hardware necessary for configuring a computer, such as a processor such as a CPU, a GPU, and a DSP, a memory such as a ROM and a RAM, and a storage device such as an HDD. It goes without saying that hardware such as an FPGA and an ASIC may be used.

For example, an information processing method (encoding method) according to the present technology is executed by the CPU by loading a program according to the present technology stored in the ROM or the like in advance into the RAM and executing the program.

Further, the transmission apparatus 1 includes a communication unit (not shown) capable of realizing wireless transmission.

The communication unit is a module for executing network communication, short-range wireless communication, and the like with another device. For example, a network module or a Bluetooth (registered trademark) module is provided as a communication unit.

The network module is an interface for connecting to a network, and a wireless LAN module such as WiFi is used.

The Bluetooth module is a module for executing short-range wireless communication conforming to the Bluetooth standard. For example, a module capable of executing communication conforming to the BLE (Bluetooth Low Energy) standard (BLE communication) or short-range wireless communication conforming to the Classic Bluetooth standard (BT communication) may be mounted.

In the example shown in FIG. 1, a smartphone is used as the transmission apparatus 1. The present technology is not limited thereto, and the transmission apparatus 1 can be realized by an arbitrary computer such as a PC (Personal Computer).

As shown in FIG. 1, in this embodiment, the transmission apparatus 1 includes, as functional blocks, an assigning unit 3, an encoding unit 4, and a detection unit 5.

The respective functional blocks are configured by, for example, a processor executing a predetermined program. It goes without saying that in order to realize these functional blocks, dedicated hardware such as an IC (integrated circuit) may be used.

The program is installed in the transmission apparatus 1 via, for example, various recording media. Alternatively, the program may be installed via the Internet or the like.

The type and the like of the recording medium on which the program is recorded are not limited, and an arbitrary computer-readable recording medium may be used. For example, an arbitrary computer-readable non-transient recording medium may be used.

In this embodiment, a case where data ACD of audio content is wirelessly transmitted will be described as an example. The data ACD of audio content corresponds to an embodiment of the content data to be played back according to the present technology.

As shown in FIG. 1, the data ACD of audio content includes a divided plurality of pieces of frame data (audio data) FD. Each of the plurality of pieces of frame data FD is to be wirelessly transmitted.

The assigning unit 3 assigns identification information (hereinafter, referred to as the frame ID) to each of the plurality of pieces of frame data FD to be wirelessly transmitted. In this embodiment, information capable of identifying order of playing back the plurality of pieces of frame data FD is assigned as the frame ID.

In the example shown in FIG. 1, assumption is made that the right side of the data ACD of audio content corresponds to the start portion of content and the left side corresponds to the end portion of content. Therefore, the plurality of pieces of frame data FD is played back in order from the rightmost frame data FD to the left side.

In this embodiment, the assigning unit 3 assigns frame IDs (#n) whose values are incremented by one from #1 to #N in order from the rightmost frame data FD. Therefore, the value of n of #n that is the frame ID indicates the playback order as it is.

It goes without saying that the format and the like of the frame ID to be assigned are not limited and arbitrary identification information capable of identifying order of playing back the plurality of pieces of frame data FD may be assigned.

The encoding unit 4 encodes each of the plurality of pieces of frame data FD to generate a plurality of pieces of encoded data ED.

In the example shown in FIG. 1, each of the plurality of pieces of frame data FD to which the frame IDs have been assigned is encoded to generate the encoded data ED.

The encoded data ED is associated with the frame ID (#n) assigned to the frame data FD before being encoded. In the present disclosure, the frame ID associated with the encoded data ED corresponds to the frame ID corresponding to the encoded data ED.

The frame ID corresponding to the encoded data ED, i.e., the frame ID assigned to the frame data FD before being encoded is identification information capable of identifying the encoded data ED.

In the following, it will be described as the frame ID assigned to the encoded data ED or the frame ID of the encoded data ED in some cases.

It can be said that the frame ID (#n) is information capable of identifying order of playing back the plurality of pieces of encoded data ED.

The encoding unit 4 encodes the frame data FD at a predetermined bit rate (compression rate) to generate the encoded data ED. In this embodiment, the encoding bit rate is variable and can be appropriately controlled. It goes without saying that the present technology is applicable even in the case where the encoding bit rate is fixe.

The specific encoding method and the like for encoding the frame data FD are not limited, and an arbitrary encoding method may be used.

The detection unit 5 detects, as identification information for regeneration (hereinafter, referred to as the ID for regeneration), the frame ID corresponding to the encoded data ED that needs to be regenerated of the generated plurality of pieces of encoded data ED.

For example, in the case where the encoded data ED whose wireless transmission has failed has occurred, the frame ID corresponding to the encoded data ED whose wireless transmission has failed is detected as the ID for regeneration.

Further, in the case where the encoded data ED discarded without being wirelessly transmitted has occurred, the frame ID corresponding to the discarded encoded data ED is detected as the ID for regeneration.

In addition, the points such as when the re-encoding is necessary and which frame ID is detected as the ID for regeneration are not limited and may be appropriately set.

The encoding unit 4 re-encodes the frame data FD to which the detected ID for regeneration has been assigned.

At that time, for example, the encoding is executed at a bit rate for re-encoding. For example, the bit rate for re-encoding is set on the basis of the transmission state of wireless transmission.

It goes without saying that the method of setting a bit rate for re-encoding is not limited. Further, the re-encoding may be executed at a fixed bit rate.

For example, the plurality of pieces of frame data FD shown in FIG. 1 is encoded in order of the frame IDs (#1 to #N), i.e., order according to the playback order. The encoded data ED thus encoded is wirelessly transmitted in the playback order.

Assumption is made that the encoded data ED whose wireless transmission has failed has occurred during wireless transmission. For example, assumption is made that wireless transmission of the encoded data ED of the frame ID (#8) has failed.

The detection unit 5 detects, as the ID for regeneration, the frame ID (#8) corresponding to the encoded data ED whose wireless transmission has failed. The encoding unit 4 re-encodes the frame data FD to which the ID for regeneration (#8) has been assigned.

The encoded data ED of the frame ID (#8) according to the re-encoding is wirelessly transmitted again. For example, it is possible to execute, while the re-encoding by the encoding unit 4 is executed, wireless transmission of the encoded data ED of the frame ID (#9) and subsequent frame IDs whose playback order is later than the encoded data ED of the frame ID (#8).

In this case, in this embodiment, it is possible to wirelessly transmit the encoded data ED of the frame ID (#8) again in the way of interrupting. For example, it is possible to transmit the encoded data ED of the frame ID (#8) corresponding to the re-encoding again after the encoded data ED of the frame ID (#10).

That is, in this data transmission system 100, it is possible to detect the encoded data ED for which re-encoding is necessary and re-encode the frame data FD for generating the encoded data ED. Further, it is possible to encode the frame data FD in order not depending on the playback order and wirelessly transmit the encoded data ED in order not depending on the playback order.

Hereinafter, transmission processing of the encoded data ED generated by the re-encoding will be referred to as the re-retransmission processing.

The reception apparatus 2 includes hardware necessary for configuring a computer, such as a processor such as a CPU, a GPU, and a DSP, a memory such as a ROM and a RAM, and a storage device such as an HDD. It goes without saying that hardware such as an FPGA and an ASIC may be used.

For example, an information processing method (decoding method) according to the present technology is executed by the CPU by loading a program according to the present technology stored in the ROM or the like in advance into the RAM and executing the program.

Further, the reception apparatus 2 includes a communication unit (not shown) capable of realizing wireless transmission.

Examples of the communication unit include the network module and the Bluetooth module described above.

In the example shown in FIG. 1, headphones are used as the reception apparatus 2. The present technology is not limited thereto, and the reception apparatus 2 can be realized by an arbitrary computer such as a PC. In this embodiment, an arbitrary computer capable of playing back the data ACD of audio content may be used.

As shown in FIG. 1, in this embodiment, the reception apparatus 2 includes, as functional blocks, a first storage unit 7, a second storage unit 8, and a decoding unit 9.

The first storage unit 7 and the second storage unit 8 are each realized by a memory, a storage device, or the like and a data management unit (not shown) that stores and reads data.

The data management unit and the decoding unit 9 are configured by, for example, a processor executing a predetermined program. It goes without saying that in order to realize these functional blocks, dedicated hardware such as an IC (integrated circuit) may be used.

The program is installed in the reception apparatus 2 via, for example, various recording media. Alternatively, the program may be installed via the Internet or the like.

The type and the like of the recording medium on which the program is recorded are not limited, and an arbitrary computer-readable recording medium may be used. For example, an arbitrary computer-readable non-transient recording medium may be used.

The first storage unit 7 stores each of the received plurality of pieces of encoded data ED in a predetermined storage area. The predetermined storage area is a physical memory space and an address is associated therewith.

The second storage unit 8 stores, on the basis of the frame ID corresponding to each of the plurality of pieces of encoded data ED, the address of the storage area of the first storage unit 7 in which each of the plurality of pieces of encoded data ED has been stored.

Storing, on the basis of the frame ID, the address of the storage area in which the encoded data ED has been stored includes an arbitrary method of storing an address so as to determine in which storage area in the first storage unit 7 the encoded data ED of each frame ID has been stored.

For example, each frame ID and the address of the storage area in which the encoded data ED of the frame ID has been stored are stored in the second storage unit 8 in association with each other. As a result, it is possible to read, by searching for the frame ID, the address of the storage area in which the encoded data ED of the frame ID has been stored. As a result, it is possible to determine which storage area in the first storage unit 7 the encoded data ED of each frame ID is stored.

In addition, an arbitrary method may be adopted.

The decoding unit 9 reads the encoded data ED stored in the first storage unit 7 and decodes the read encoded data ED.

In this embodiment, the encoded data ED is read from the first storage unit 7 on the basis of the address stored in the second storage unit 8 on the basis of the frame ID and decoded.

As a result, it is possible to efficiently decode the received plurality of pieces of encoded data ED.

For example, assumption is made that the transmission apparatus 1 performs re-encoding for the encoded data ED whose wireless transmission has failed or the like. Then, assumption is made that the transmission apparatus 1 wirelessly transmits the encoded data ED in order not depending on the playback order (order that is not in order of #1 to #N).

Also in such a case, in the reception apparatus 2, the address of the storage area in which the encoded data ED has been stored on the basis of the frame ID is stored. That is, the address is stored so that the storage area in which the encoded data ED of each frame ID of the first storage unit 7 has been stored can be determined.

Therefore, it is possible to read, from the first storage unit 7, the encoded data ED in order according to the playback order (order of the frame ID #1 to #N). As a result, it is possible to decode the encoded data ED in order according to the playback order (order of the frame ID #1 to #N). As a result, it is possible to properly play back the data ACD of audio content.

First Embodiment

Regarding details of the transmission apparatus 1 and the reception apparatus 2 shown in FIG. 1, a first embodiment will be described.

[Configuration Example of Transmission Apparatus]

Figure 2:
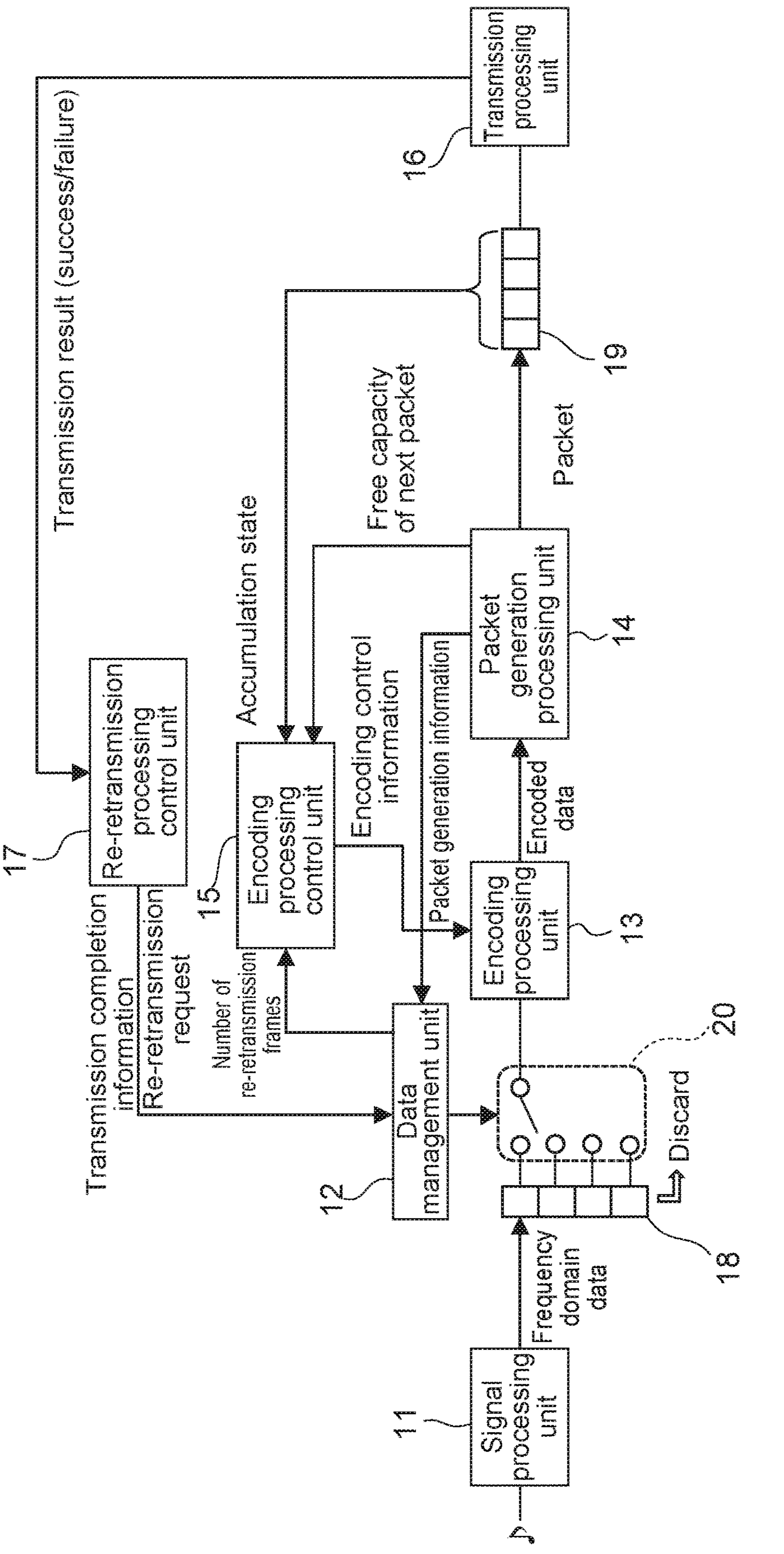
FIG. 2 is a block diagram showing a functional configuration example of a transmission apparatus.

FIG. 2 is a block diagram showing a functional configuration example of the transmission apparatus 1.

The transmission apparatus 1 includes a signal processing unit 11, a data management unit 12, an encoding processing unit 13, a packet generation processing unit 14, an encoding processing control unit 15, a transmission processing unit 16, and a re-retransmission processing control unit 17.

These respective functional blocks are configured by, for example, a processor executing a predetermined program. It goes without saying that in order to realize these functional blocks, dedicated hardware such as an IC (integrated circuit) may be used.

Further, the transmission apparatus 1 includes a frame buffer 18 and a packet buffer 19.

Hereinafter, the respective functional blocks and buffers shown in FIG. 1 will be referred to as the transmission system constructed in the transmission apparatus 1 in some cases.

The frame data FD constituting the data ACD of audio content is input to the signal processing unit 11. For example, the frame data FD is input from the storage device or the like in the transmission apparatus 1 to the signal processing unit 11.

In this embodiment, the signal processing unit 11 converts the input frame data FD into time frequency by MDCT (Modified Discrete Cosine Transform) or the like to generate frequency domain data.

The present technology is applicable to both the case where the frame data FD is generated as time domain data and the case where the frame data FD is generated as frequency domain data.

Both the time domain data before being converted by the signal processing unit 11 and the frequency domain data after being converted by the signal processing unit 11 can be an embodiment of the frame data FD according to the present technology.

The data management unit 12 assigns a frame ID to the frame data FD generated by the signal processing unit 11. For example, the frame ID (#n) illustrated in FIG. 1 is assigned.

The data management unit 12 stores the frame data FD to which the frame ID has been assigned in the frame buffer 18.

The data management unit 12 is capable of also discarding the frame data FD stored in the frame buffer 18. That is, the data management unit 12 is capable of deleting the frame data FD from the frame buffer 18.

The data management unit 12 is capable of managing the relationship between the frame data FD generated by the signal processing unit 11 and the packet generated by the packet generation processing unit 14.

In this embodiment, the data management unit 12 associates a packet ID with the frame data FD stored in the frame buffer 18 on the basis of packet generation information output by the packet generation processing unit 14. Specifically, the frame data FD is associated with the packet ID of the packet in which the frame data FD is stored.

The data management unit 12 is capable of controlling, by controlling a switch 20, the output of the frame data FD stored in the frame buffer 18 to the encoding processing unit 13. The frame data FD connected to the encoding processing unit 13 by the switch 20 is output to the encoding processing unit 13.

The encoding processing unit 13 reads, on the basis of switching by the data management unit 12, the frame data FD from the frame buffer 18 and encodes the read frame data FD. As a result, the encoded data ED is generated.

The encoding processing unit 13 executes the encoding at the bit rate set by the encoding processing control unit 15.

The packet generation processing unit 14 accumulates the encoded data ED generated by the encoding processing unit 13 and generates one packet when the accumulated encoded data ED has reached a predetermined capacity or a predetermined number of pieces of data. The predetermined capacity and the predetermined number of pieces of data are designated by, for example, a system (not shown).

The packet generation processing unit 14 stores the generated packet in the packet buffer 19.

The packet generation processing unit 14 generates, when storing the packet in the packet buffer 19, packet generation information including the packet ID, the frame ID of the encoded data ED stored in the packet, the address of the storage area in which the packet has been stored, and the like, and outputs the generated packet generation information to the data management unit 12.

In this embodiment, the packet corresponds to the transmission-unit of wireless transmission. Further, the data contained in the packet corresponds to the transmission encoded data that falls within the transmission-unit. The packet generation processing unit 14 generates transmission encoded data including one or more pieces of the encoded data ED and stores the generated transmission encoded data in a packet.

Therefore, generating a packet corresponds to generating transmission encoded data that falls within the transmission-unit. Further, the total capacity, free capacity, and the like of the packet are included in information based on the size of the packet and corresponds to the information based on the size of the transmission-unit.

The transmission processing unit 16 takes out the packet stored in the packet buffer 19 and executes transmission processing for the reception apparatus 2. In this embodiment, the packet is output to the communication unit including a Bluetooth or the like, and transmission to the reception apparatus 2 is attempted.

In the case where an ACK indicating that the packet has been normally received has returned from the reception apparatus 2, the packet is discarded and the processing proceeds to transmission processing of the next packet.

In the case where an ACK indicating that the packet has been normally received has not returned from the reception apparatus 2 or a request for retransmission has been made from the reception apparatus 2, the transmission processing unit 16 executes retransmission processing.

The retransmission processing is processing of repeatedly transmitting the packet taken out from the packet buffer 19.

In this embodiment, assumption is made that the upper limit number of times or the upper limit time (time allowed for retransmission processing) are defined in advance for retransmission processing. In the case where the number of times the same packet is transmitted by the retransmission processing has reached the upper limit number of times or the time for executing the retransmission processing has reached the upper limit time, the retransmission processing is stopped. When the retransmission processing is stopped, the packet is discarded and the processing proceeds to the transmission processing of the next packet.

Note that in this embodiment, when the transmission processing unit 16 has taken out a packet from the packet buffer 19, the packet is deleted from the packet buffer 19. Therefore, when the packet is discarded by the transmission processing unit 16, the encoded data ED stored in the packet is discarded from the transmission system shown in FIG. 1.

The re-retransmission processing control unit 17 checks the transmission result of the previous packet for the transmission processing unit 16 at the timing when the packet was taken out from the packet buffer 19. For example, the re-retransmission processing control unit 17 requests the transmission processing unit 16 for the previous transmission result (success/failure).

The re-retransmission processing control unit 17 outputs, in the case where the transmission of the previous packet has succeeded, transmission completion information to the data management unit 12.

The re-retransmission processing control unit 17 outputs, in the case where the transmission of the previous packet has failed, a re-retransmission request to the data management unit 12.

The timing for checking the transmission result of a packet, the method of checking the transmission result of a packet, and the like are not limited and may be arbitrarily set.

The encoding processing control unit 15 sets the encoding bit rate of the frame data FD by the encoding processing unit 13. The set bit rate is output to the encoding processing unit 13 as encoding control information.

In this embodiment, the encoding processing control unit 15 sets each of the bit rate for initial encoding and the bit rate for re-encoding.

For example, at the start of playing back the data ACD of audio content, initialization processing is executed by a system (not shown) or the like on the respective blocks of the transmission system shown in FIG. 1.

Encoding executed on the frame data FD output to the encoding processing unit 13 as an initial (first) output after the initialization processing corresponds to the initial encoding. The bit rate used during the initial encoding is the bit rate for initial encoding.

The bit rate for re-encoding is a bit rate used when the frame data FD is re-encoded.

Hereinafter, the encoded data ED generated by the initial encoding by the encoding processing unit 13 will be referred to as the initially-encoded data ED1 in some cases.

Further, the encoded data ED generated by the re-encoding by the encoding processing unit 13 will be referred to as the re-encoded data ED2 in some cases.

Note that the initial encoding can be said to be normal encoding. Therefore, the initially-encoded data can be said to be normal encoded data. Alternatively, the initially-encoded data can be said to be non-re-encoded data, newly-registered data, or the like.

The encoding processing control unit 15 acquires the number of pieces of frame data (hereinafter, referred to as the re-retransmission frame) FD1 of a target for a re-retransmission request from the data management unit 12. In the case where the number of re-retransmission frames FD1 is zero, the bit rate for initial encoding is set and output to the encoding processing unit 13.

As the method of setting the bit rate for initial encoding, an arbitrary method may be adopted.

For example, by applying the technology described in Patent Literature 1 (Japanese Patent No. 6540189), it is possible to transmit the encoded data ED to be played back so that the playing is not interrupted without estimating the communication quality. Note that a fixed bit rate may be adopted.

In the case where the number of re-retransmission frames FD1 is one or more, a bit rate for re-encoding is set and output to the encoding processing unit 13.

For example, the bit rate for re-encoding is calculated on the basis of the free capacity of the next packet acquired from the packet generation processing unit 14, the number of re-retransmission frames, and the number of packets stored in the packet buffer 19. Note that the number of packets stored in the packet buffer 19 can be acquired on the basis of the accumulation state of the packet buffer 19.

In this embodiment, it is possible to estimate the transmission state from the number of packets stored in the packet buffer 19. In the case where the number of accumulated packets is small, it is estimated that the transmission state is good. In the case where the number of accumulated packets is large, it is estimated that the transmission state is bad.

The calculation of a bit rate for re-encoding based on the free capacity of the next packet, the number of re-retransmission frames, and the number of packets stored in the packet buffer 19 corresponds to an embodiment of the setting of a bit rate for re-encoding based on the transmission state of wireless transmission.

Further, the calculation of a bit rate for re-encoding based on the free capacity of the next packet, the number of re-retransmission frames, and the number of packets stored in the packet buffer 19 corresponds to an embodiment of the setting of a bit rate for re-encoding based on the size of the transmission-unit.

For example, assumption is made that no untransmitted packet is stored in the packet buffer 19 and the packet buffer 19 is empty. In this case, since the transmission state is good, it is possible to determine that the failure of transmission of the encoded data ED has accidentally occurred.

For this reason, for example, in the case where the number of re-retransmission frames FD1 is three and the free capacity of the next packet is 100 Bytes, one of the re-retransmission frames FD1 is encoded with 100 Bytes. A bit rate for re-encoding is set such that the remaining two re-retransmission frames FD1 are included in the subsequent packet.

In the case where the number of re-retransmission frames FD1 is three, the free capacity of the next packet is 20 Bytes, and there is no enough free capacity, a bit rate for re-encoding is set such that all of the three re-retransmission frames FD1 are included in the subsequent packet.

As described above, it is possible to individually control the bit rate for re-encoding for each of the re-retransmission frames FD1.

In the case where the transmission state is good, a relatively high value is set as a bit rate for re-encoding and included in each subsequent packet. As a result, it is possible to realize wireless transmission prioritizing the sound quality (data quality) of the re-retransmission frame FD1.

Assumption is made that there is more than a certain number of untransmitted packets in the packet buffer 19. In this case, since the transmission state is bad, as many pieces of encoded data ED as possible are made contained in a packet to generate one packet.

As a result, since the many pieces of encoded data ED contained in the packet are played back by the reception apparatus 2 that has received the packet, the playing time becomes long. As a result, it is possible to extend the time during which the next packet needs to be transmitted to the reception apparatus 2. That is, it is possible to extend the packet transmission interval and gain the time that can be spent transmitting the next packet.

For example, in the case where the number of re-retransmission frames FD1 is three and the free capacity of the next packet is 100 Bytes, each of the three re-retransmission frames FD1 is encoded with 33 Bytes. If the encoding size (encoding bit rate) has a lower limit, the lower limit value is set as a bit rate for re-encoding.

For example, in the case where the lower limit value is 50 Bytes, a bit rate for re-encoding is set to 50 Bytes for two re-retransmission frames FD1 of the three re-retransmission frames FD1. A bit rate for re-encoding is set such that the remaining one re-retransmission frame FD1 is included in the subsequent packet.

In this embodiment, the encoding processing unit 13 executes re-encoding and to generate the re-encoded data ED2. In this case, the packet generation processing unit 14 generates a packet including the re-encoded data ED2. That is, transmission encoded data including the re-encoded data ED2 is generated.

At this time, transmission encoded data including the re-encoded data ED2 and the initially-encoded data ED1 generated by initial encoding is generated in some cases. That is, the re-encoded data ED2 and the initially-encoded data ED1 coexist in one packet in some cases. Further, transmission encoded data including the plurality of pieces of encoded data ED whose playback order is not continuous (the frame ID (#) is not continuous) is generated in some cases.

In such a case, transmission encoded data may be generated such that the re-encoded data ED2 is preferentially wirelessly transmitted.

For example, a bit rate for re-encoding is appropriately set so that it can be contained in the free capacity of the packet. Then, the re-encoded data ED2 is preferentially made contained to generate a packet. As a result, it is possible to preferentially transmit the encoded data ED whose transmission has failed and suppress sound skipping and the like.

Further, for example, the audio of the initially-encoded data ED1 may be prioritized. For example, assumption is made that the total capacity of a packet is 300 Bytes and one piece of re-encoded data ED2 and two pieces of initially-encoded data ED1 are stored in one packet.

In this case, 50 Bytes is assigned to one re-encoded data ED2 as a bit rate for re-encoding. Then, 250 Bytes is assigned to each of the remaining two pieces of initially-encoded data ED1 as a bit rate for initial encoding.

In addition, as the method of setting a bit rate for initial encoding and a bit rate for re-encoding, an arbitrary method may be adopted. For example, an arbitrary method based on the size of a packet (transmission-unit) may be adopted. Further, as a bit rate for re-encoding, a fixed bit rate may be adopted. In this case, a fixed value may be arbitrarily set.

The functions of the respective blocks shown in FIG. 2 as an embodiment of the present technology will be described.

The data management unit 12 functions as an embodiment of the assigning unit according to the present technology. Further, the assigning unit 3 shown in FIG. 1 is realized by the data management unit 12.

The encoding processing unit 13, the packet generation processing unit 14, and the encoding processing control unit 15 function as an embodiment of the encoding unit according to the present technology. Further, the encoding unit 4 shown in FIG. 1 is realized by the encoding processing unit 13, the packet generation processing unit 14, and the encoding processing control unit 15.

The re-retransmission processing control unit 17 and the data management unit 12 function as the detection unit according to the present technology. Further, the detection unit 5 shown in FIG. 1 is realized by the re-retransmission processing control unit 17 and the data management unit 12.

Identification information (frame ID) corresponding to each of the one or more pieces of the encoded data ED included in the transmission encoded data whose wireless transmission has failed is detected by the re-retransmission processing control unit 17 and the data management unit 12 as identification information for regeneration (ID for regeneration).

The transmission processing unit 16 functions as an embodiment of the transmission unit according to the present technology. The plurality of pieces of encoded data ED and transmission encoded data are wirelessly transmitted by the transmission processing unit 16.

The frame buffer 18 functions as an embodiment of the storage unit according to the present technology. The plurality of pieces of frame data FD is stored by the frame buffer 18.

Further, the data management unit 12 functions also as an embodiment of the output control unit according to the present technology.

[Operation Example of Transmission Apparatus]

First, an example of a basic operation relating to wireless transmission of data by the transmission apparatus 1 will be described.

Initialization processing is executed on each block shown in FIG. 1.

The frame data FD including frequency domain data is output by the signal processing unit 11 in accordance with the playback order.

A frame ID is assigned to each of the plurality of pieces of frame data FD by the data management unit 12 and stored in the frame buffer 18.

Further, the data management unit 12 controls the switch 20 and outputs the frame data FD to the encoding processing unit 13 in accordance with the playback order.

The encoding processing unit 13 encodes the frame data FD to generate the initially-encoded data ED1. At this time, the encoding is executed at the bit rate for initial encoding set by the encoding processing control unit 15.

Transmission encoded data including one or more pieces of the encoded data ED is generated by the packet generation processing unit 14 and is stored in a packet. As a result, a packet is generated. The generated packet is sequentially stored in the packet buffer 19.

The transmission processing unit 16 takes out the packet from the packet buffer 19 and executes transmission processing.

In the case where the transmission of a packet has succeeded, the re-retransmission processing control unit 17 checks the transmission result of that fact. Then, the re-retransmission processing control unit 17 outputs transmission completion information to the data management unit 12.

The data management unit 12 detects, when receiving the transmission completion information, the frame ID corresponding to the encoded data ED included in the packet as a transmitted ID on the basis of the packet ID of the packet whose transmission has succeeded. Then, the data management unit 12 deletes, from the frame buffer 18, the frame data FD to which the transmitted ID has been assigned. That is, the frame data FD whose transmission has succeeded is discarded from the frame buffer 18 because it does not need to be re-encoded.

In the case where the transmission of a packet has failed, i.e., retransmission processing by the transmission processing unit 16 is stopped and the packet is discarded, the re-retransmission processing control unit 17 checks the transmission result of that fact. Then, the re-retransmission processing control unit 17 outputs a re-retransmission request to the data management unit 12. The re-retransmission request includes the packet ID of the packet whose transmission has failed.

The data management unit 12 detects, when receiving the re-retransmission request, the frame ID corresponding to the encoded data ED included in the packet as the ID for regeneration on the basis of the packet ID of the packet whose transmission has failed.

The data management unit 12 controls the switch 20 and connects the re-retransmission frame FD1 to which the ID for regeneration has been assigned to the encoding processing unit 13.

The encoding processing unit 13 reads and re-encodes the re-retransmission frame FD1. As a result, the re-encoded data ED2 is generated. At this time, the encoding is executed at the bit rate for re-encoding set by the encoding processing control unit 15.

Transmission encoded data including the re-encoded data ED2 is generated by the packet generation processing unit 14 and is stored in a packet. As a result, a packet is generated.

For example, transmission encoded data is generated such that the re-encoded data ED2 is preferentially wirelessly transmitted. That is, the re-encoded data ED2 is preferentially made contained in a new packet to generate a packet. For example, in the case where there is a still enough free capacity, the initially-encoded data ED1 is made contained to generate a packet.

The generated packet is stored in the packet buffer 19. Note that in the case where a plurality of packets is stored in the packet buffer 19, a packet including the re-encoded data ED2 may be preferentially wirelessly transmitted by the transmission processing unit 16.

Further, there present technology is not limited to the case where the output of transmission completion information and a re-retransmission request from the re-retransmission processing control unit 17 to the data management unit 12 is executed in chronological order when transmission of a packet failed and succeeded. Assumption is made that the corresponding time series of the output of the transmission completion information and a re-retransmission request is earlier or later than the time series when the transmission failed and succeeded. Also in this case, the transmission completion information and the re-retransmission request only need to be rearranged on the basis of the packet ID or the like included in each piece of information.

[Processing Example by Transmission Apparatus]

A specific processing example by the transmission apparatus 1 will be described.

In this embodiment, the transmission apparatus 1 independently execute each of transmission processing, transmission monitoring processing, and encoding processing. The respective processes are appropriately executed in synchronization with each other. As the method of synchronizing the respective processes, an arbitrary method may be used.

The transmission processing, the transmission monitoring processing, and the encoding processing are realized by cooperation of the respective blocks shown in FIG. 1.

[Transmission Processing]

In this embodiment, the transmission processing is executed by the transmission processing unit 16.

In this embodiment, assumption is made that wireless transmission based on the BLE standard is executed.

The transmission processing acquires, from the packet buffer 19, a packet to be wirelessly transmitted and notifies transmission monitoring processing of that the packet has been acquired.

For example, processing of each layer of the link manger, baseband, and RF is executed on the packet acquired from the packet buffer 19. Then, a baseband packet to be wirelessly transmitted is generated, output to a Bluetooth module, and transmitted.

Further, the transmission processing outputs a transmission result (success/failure) of the packet in response to a request form the transmission monitoring processing. For example, a transmission result of the packet is acquired by executing inquiry checking for the Bluetooth module by an HCI command in response to a request from the transmission monitoring processing. Then, the acquired transmission result is output to the transmission monitoring processing.

[Transmission Monitoring Processing]

Figure 3:
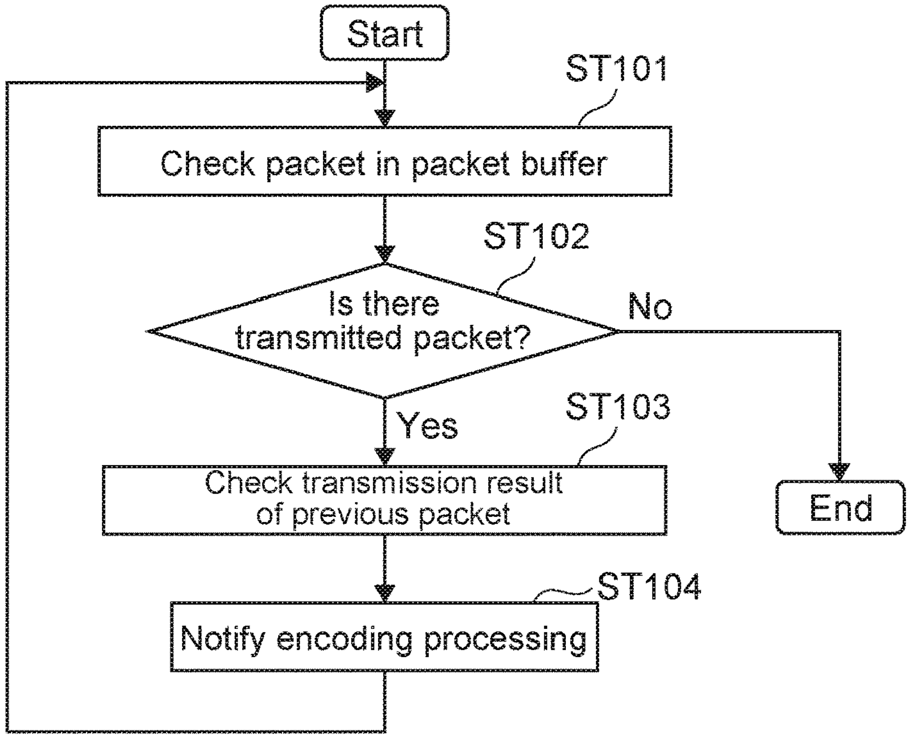
FIG. 3 is a flowchart showing an example of transmission monitoring processing.

FIG. 3 is a flowchart showing an example of transmission monitoring processing.

The transmission monitoring processing is executed by the re-retransmission processing control unit 17.

In this embodiment, the transmission monitoring processing is started at the timing when the transmission processing acquired a packet from the packet buffer 19.

As shown in FIG. 3, a packet in the packet buffer 19 is checked and the packet ID of the stored packet is recorded (Step 101).

Whether or not there is a packet transmitted by the transmission processing is determined (Step 102). In this embodiment, in the case where a packet has been acquired from the packet buffer 19 by the transmission processing, it is determined that there is a transmitted packet.

Since a packet has been acquired from the packet buffer 19 at the time when the transmission monitoring processing was started, Step 102 is Yes.

The transmission result (success/failure) of the previous packet is requested from the transmission processing and the transmission result is checked (Step 103).

Encoding processing is notified of the transmission result (success/failure) (Step 104).

Returning to Step 101, whether or not there is a newly-transmitted packet is determined in Step 102. In the case where there is no newly-transmitted packet, Step 102 is No and the transmission monitoring processing ends.

In the case where there is a newly-transmitted packet, the processing proceeds to Step 103 again.

[Encoding Processing]

Figure 4:
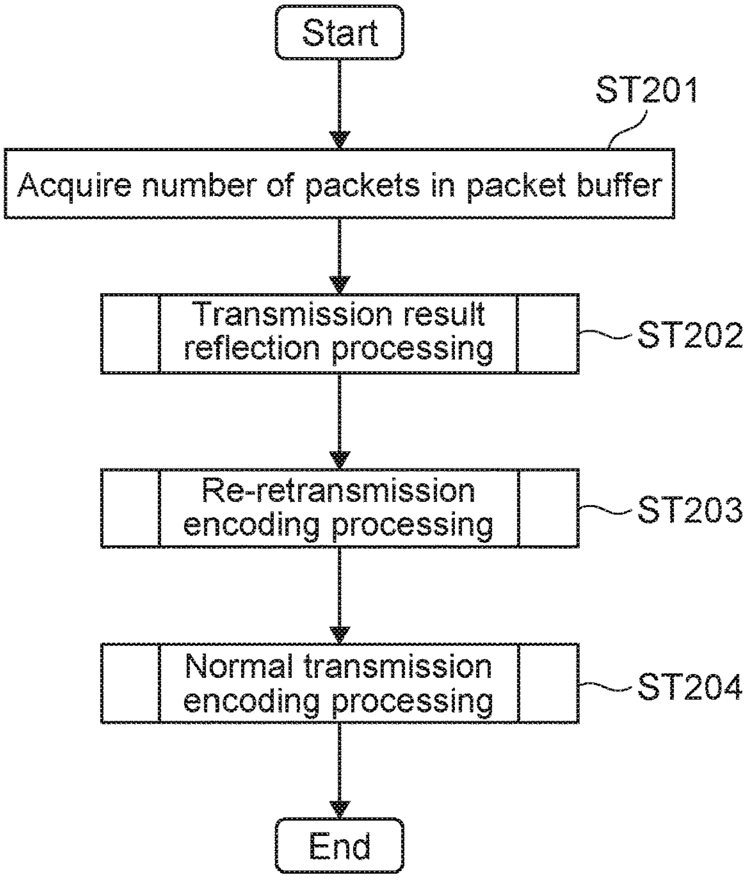
FIG. 4 is a flowchart showing an example of encoding processing.

FIG. 4 is a flowchart showing an example of encoding processing. The encoding processing is executed by the data management unit 12, the encoding processing unit 13, the packet generation processing unit 14, and the encoding processing control unit 15. For example, the encoding processing is started at regular intervals. That is, the encoding processing is started at a predetermined interval such as 20 ms (milliseconds). The number of packets in the packet buffer 19 is acquired (Step 201). Transmission result reflection processing is executed and the transmission result of the packet transmitted up to the time of the previous startup is acquired. The frame buffer 18 and the like are updated on the basis of the acquired transmission result (Step 202). Re-retransmission encoding processing is executed and the frame data FD that needs to be re-encoded is processed (Step 203). Finally, normal transmission encoding processing is executed and the frame data FD to be normally transmitted (corresponding to initial transmission) is processed (Step 204).

Figure 5:
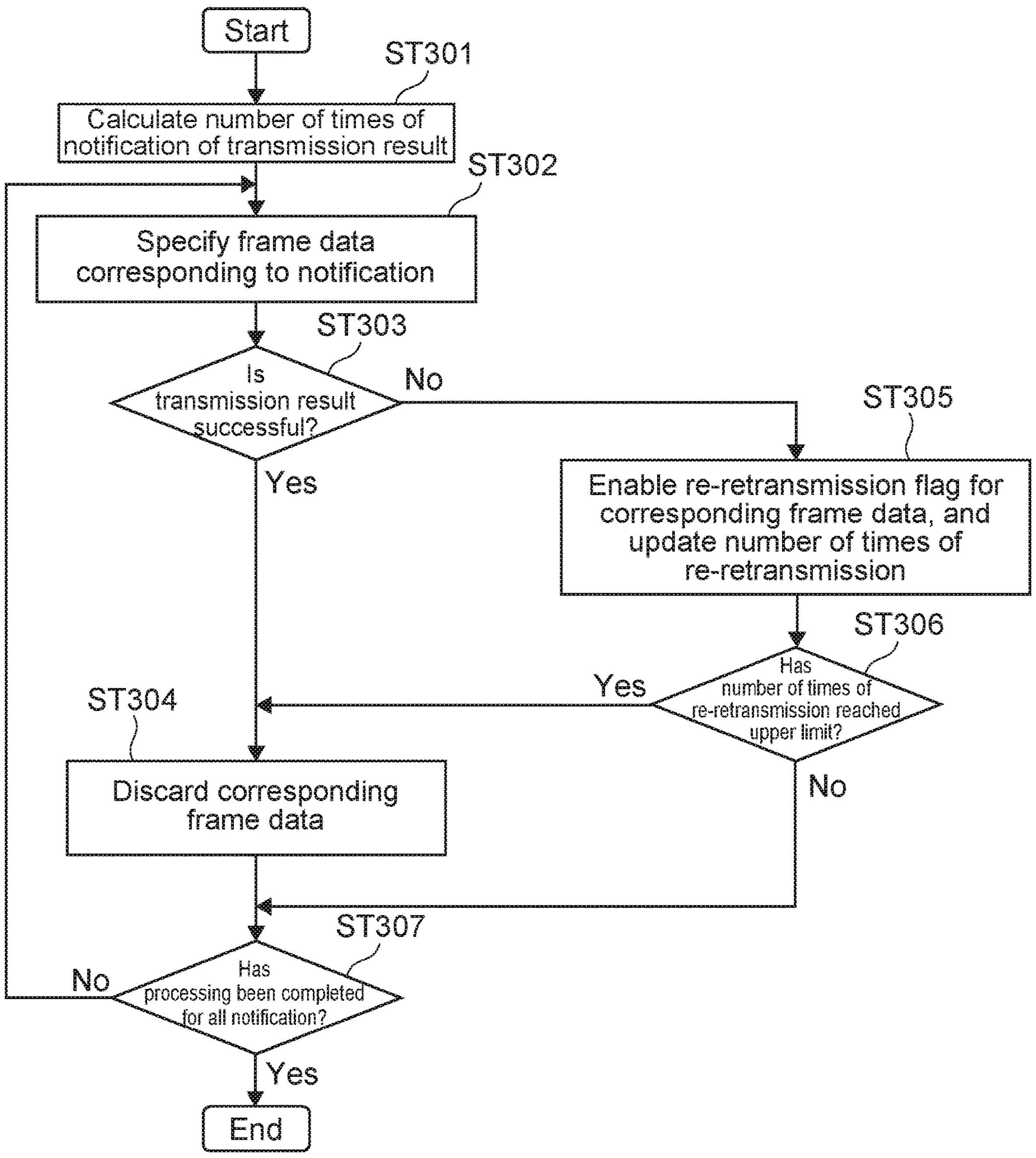
FIG. 5 is a flowchart showing an example of transmission result reflection processing.

FIG. 5 is a flowchart showing an example of transmission result reflection processing.

A transmission result of a packet provided from the transmission monitoring processing is acquired and the number of times of notification is calculated (Step 301). The processes of Steps 302 to 306 shown below are executed on the notification, and the transmission result reflection processing ends when the processes are completed for all the notification.

For each of all the notification, the frame data FD corresponding to the notification is specified (Step 302). For example, the corresponding frame data FD is specified on the basis of the frame ID assigned to each piece of frame data FD.

Whether or not the transmission result is successful is determined (Step 303).

In the case where the transmission result is successful (Yes in Step 303), the corresponding frame data FD is discarded from the frame buffer 18 (Step 304).

In the case where the transmission result is unsuccessful (No in Step 303), it is determined that the corresponding frame data is the re-retransmission frame FD1 that needs to be re-retransmitted, and a re-retransmission flag is enabled. Further, the number of times of re-retransmission is updated (incremented by one) (Step 305).

Note that in the example shown in FIG. 5, the re-retransmission corresponds to re-encoding. Therefore, the re-retransmission flag can be said to be a re-encoding flag. Further, the number of times of re-retransmission can be said to be the number of times of re-encoding.

Whether or not the updated number of times of re-retransmission has reached the predetermined upper limit number of times is determined (Step 306). In the case where the number of times of re-retransmission has reached the upper limit number of times (Yes in Step 306), the corresponding frame data FD (re-retransmission frame FD1) is discarded from the frame buffer 18, similarly to the case where the transmission result has been successful (Step 304).

As described above, the upper limit number of times may be determined in advance for the re-retransmission processing (re-encoding). Further, the upper limit time (time allowed for the re-retransmission processing) may be determined for the re-retransmission processing. As a result, it is possible to prevent unnecessary data storage, unnecessary encoding processing, transmission processing, and the like for the frame data FD that cannot be transmitted in time, and the like, realize a proper operation of the transmission system, and improve the operation accuracy.

The upper limit number of times and the upper limit time are determined, for example, at the time of designing the system. Alternatively, information of a buffer on the reception side (e.g., the size of a reception buffer 29 and the size of an ID buffer 30 described below) may be acquired from the reception apparatus 2 to determine the upper limit number of times and the upper limit time on the basis of the information. In addition, the upper limit number of times and the upper limit time may be determined by an arbitrary method.

In Step 307, whether or not the processing has been completed for all the notification is determined. When the processing has been completed for all the notification, the transmission result reflection processing ends.

Figure 6:
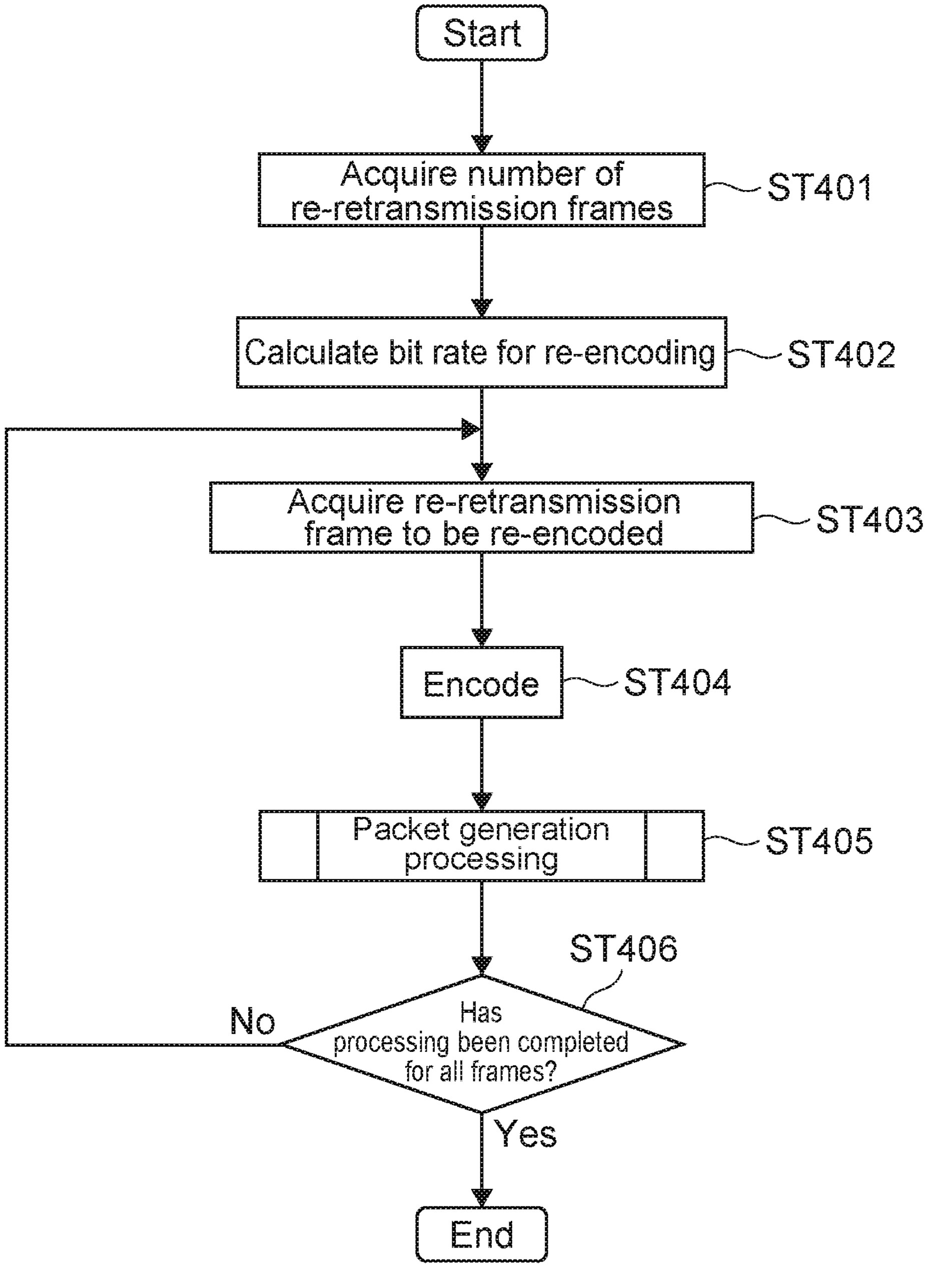
FIG. 6 is a flowchart showing an example of re-retransmission encoding processing.

FIG. 6 is a flowchart showing an example of re-retransmission encoding processing.

The number of pieces of frame data FD whose re-retransmission flag is enabled by the transmission result reflection processing, i.e., the number of re-retransmission frames FD1 is acquired (Step 401). Note that the re-retransmission frame FD1 discarded in Step 304 in FIG. 5 is excluded.

A bit rate for re-encoding is calculated on the basis of the number of re-retransmission frames FD1, the number of packets in the packet buffer 19 acquired in Step 201 shown in FIG. 4, and the free capacity of the next packet (Step 402). The bit rate for re-encoding may differ for each piece of re-retransmission frame FD1.

For example, assumption is made that in the case where there is a plurality of re-retransmission frames FD1, the free capacity of the next packet is 60 Bytes. In this case, it is also possible to assign 60 Bytes to only one piece of re-retransmission frame FD1 and assign a different bit rate such as 50 Bytes to the next and subsequent re-retransmission frames FD1.

The re-retransmission frame FD1 to be re-encoded is acquired from the frame buffer 18 (Step 403).

The acquired re-retransmission frame FD1 is encoded at a bit rate for re-encoding (Step 404). As a result, re-encoding of frame data is executed to generate the re-encoded data ED2.

The re-encoded data ED2 is passed to packet generation processing, and a packet is generated (Step 405). When a packet is generated, the re-retransmission flag is disabled. Note that the re-retransmission flag may be disabled in accordance with the generation of the re-encoded data ED2.

When the re-encoding and generation of a packet are completed for all the re-retransmission frames FD1, the re-retransmission encoding processing ends (Step 406).

Figure 7:
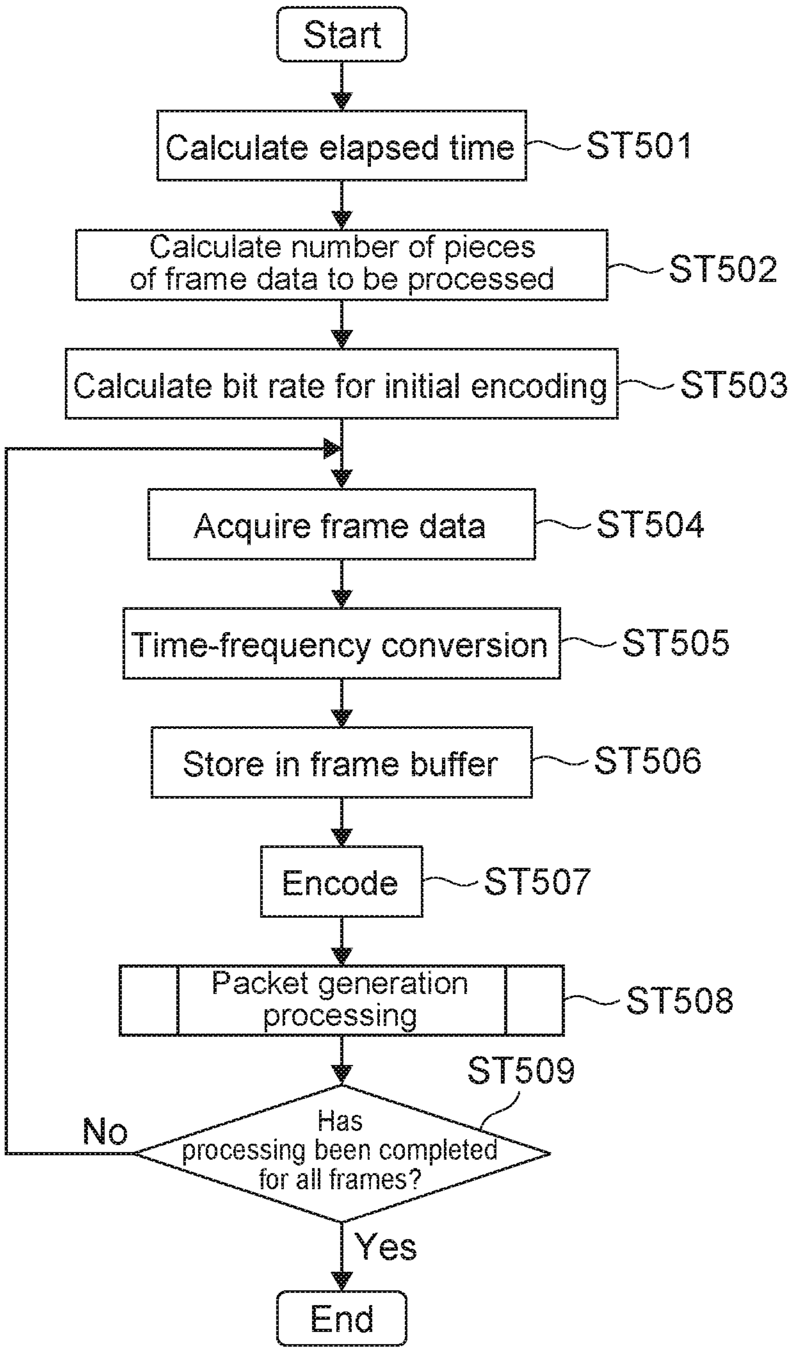
FIG. 7 is a flowchart showing an example of normal transmission encoding processing.

FIG. 7 is a flowchart showing an example of normal transmission encoding processing.

The elapsed time since the previous startup is calculated (Step 501).

The number of pieces of frame data FD to be processed is calculated on the basis of the elapsed time and the playback time (hereinafter, referred to as the one frame time) of one piece of frame data FD that is a processing-unit (Step 502).

For example, in the case where the elapsed time is 20 ms and the one frame time is 5 ms, the number of frames to be processed this time is calculated to be four. Note that assumption is made that the elapsed time is not a multiple of the one frame time. In this case, the surplus time (elapsed time−(calculated number×one frame playback time)) may be carried over to the next calculation of the number of frames. Alternatively, the excess time ((calculated number× one frame playback time))−elapsed time) may be deducted from the elapsed time when calculating the number of frames next time.

A bit rate for initial encoding is calculated (Step 503). For example, the bit rate for initial encoding is calculated on the basis of the number of packets in the packet buffer 19 acquired in Step 201 shown in FIG. 4, the number of re-retransmission frames FD1 added by re-retransmission encoding processing shown in FIG. 6, and the free capacity of the next packet.

For example, in the case where the free capacity of the next packet is 200 Bytes, 200 Bytes may be assigned to the first frame data FD and 300 Bytes may be assigned to the next and subsequent pieces of frame data FD.

Alternatively, in the case where the free capacity of the next packet is small, i.e., 20 Bytes, 300 Bytes may be intentionally assigned each piece of frame data FD on the premise that the data is made contained in the next packet.

The pieces of frame data FD of the number calculated in Step 502 are acquired (Step 504).

The time-frequency conversion is executed on the frame data FD, and the frame data FD converted into frequency domain data is stored in the frame buffer 18 (Steps 505 and 506).

These pieces of frame data FD are encoded at a bit rate for initial encoding (Step 507). As a result, the initially-encoded data ED1 is generated.

The initially-encoded data ED1 is passed to the packet generation processing, and a packet is generated (Step 508).

When the encoding and generation of a packet are completed for all the frame data FD acquired in Step 504, the normal transmission encoding processing ends (Step 509).

In the packet generation processing of Steps 405 and 508, the encoded data ED (the re-encoded data ED2 and the initially-encoded data ED1) are accumulated, and one packet is generated when a predetermined capacity or a predetermined number of pieces of data has been reached. The generated packet is stored in the packet buffer 19.

For example, assumption is made that the total capacity of the packet is 1000 Bytes and the maximum number of stored frames is 15. Then, assumption is made that the encoded data ED corresponding to 800 Bytes has already been accumulated and the encoded data ED of 300 Bytes has been added.

In this case, a packet is generated by the encoded data corresponding to 800 Bytes first and stored in the packet buffer 19. The accumulated encoded data ED is cleared and the added encoded data ED is accumulated.

Alternatively, even if the accumulated encoded data ED is only 300 Bytes, in the case where the number of pieces of encoded data ED is 15, a packet storing 15 frames is generated and stored in the packet buffer 19. Then, the accumulated encoded data ED is cleared.

[Configuration Example of Reception Apparatus]

Figure 8:
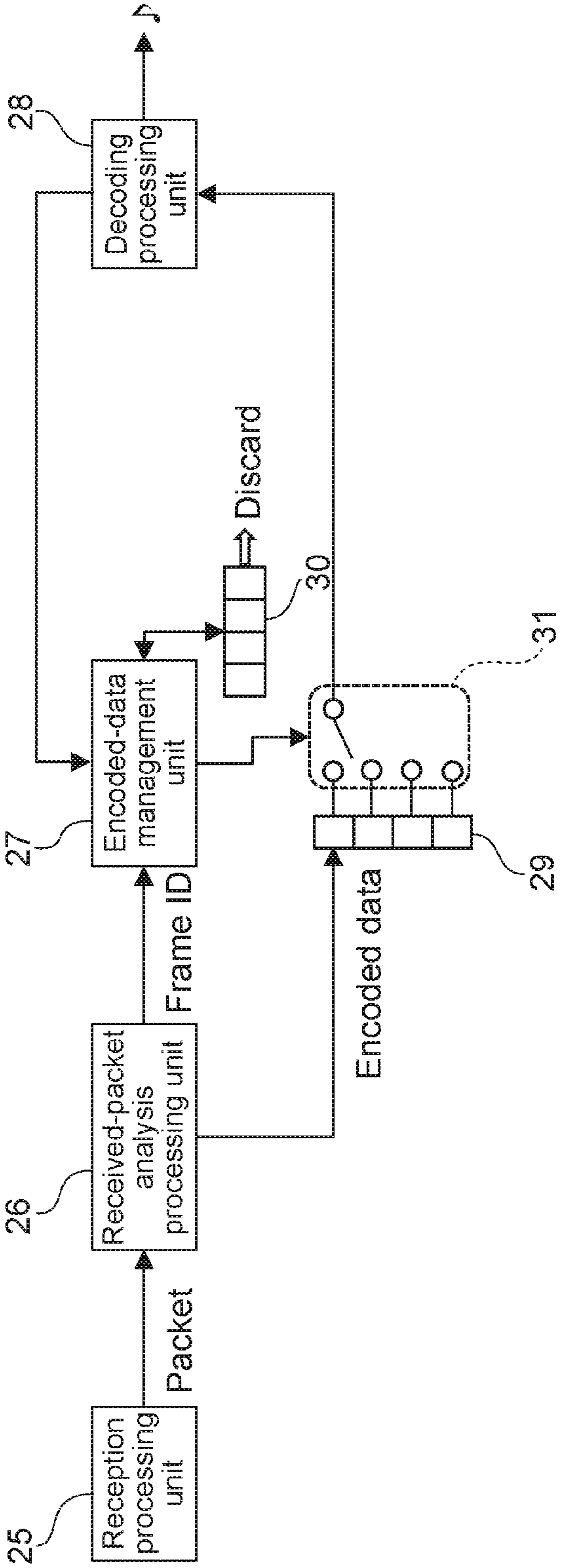
FIG. 8 is a block diagram showing a functional configuration example of a reception apparatus.

FIG. 8 is a block diagram showing a functional configuration example of the reception apparatus 2.

The reception apparatus 2 includes a reception processing unit 25, a received-packet analysis processing unit 26, an encoded-data management unit 27, and a decoding processing unit 28.

The respective functional blocks are configured by, for example, a processor executing a predetermined program. It goes without saying that in order to realize these functional blocks, dedicated hardware such as an IC (integrated circuit) may be used.

Further, the reception apparatus 2 includes the reception buffer 29 and the ID buffer 30.

Hereinafter, the respective functional blocks and buffers shown in FIG. 8 will be referred to as the reception system constructed in the reception apparatus 2 in some cases.

The reception processing unit 25 receives the packet wirelessly transmitted from the transmission apparatus 1 and checks whether or not the packet is normal.

For example, whether or not the packet is normal is checked by error detection checksum. In the case where the packet is normal, ACK is transmitted to the transmission apparatus 1. Further, the received packet is output to the received-packet analysis processing unit 26.

In the case where the packet is not normal, the transmission apparatus 1 is requested to retransmit a packet. When the retransmission request reaches the transmission apparatus 1, retransmission processing is executed by the transmission processing unit 16 of the transmission apparatus 1.

The received-packet analysis processing unit 26 decomposes the packet received from the reception processing unit 25 into data in units of frame data. That is, each piece of encoded data ED is acquired from the transmission encoded data stored in the packet in association with the frame ID (#n) capable of identifying the playback order.

The acquired encoded data ED is added to the end of the reception buffer 29 as it is. That is, in this embodiment, the received encoded data ED is stored in the storage area in the reception buffer 29 in order of the reception.

Note that assumption is made that a plurality of pieces of encoded data, e.g., the encoded data of ID (#10), ID (#11), and ID (#7), is taken out from the packet. As described above, in this embodiment, transmission encoded data including the plurality of pieces of encoded data ED whose playback order is not continuous is stored in the packet in some cases.

These three pieces of encoded data ED are pieces of encoded data ED received at the same timing. The plurality of pieces of encoded data ED received at the same timing is added to the end of the reception buffer 29 in arbitrary order.

Adding the plurality of pieces of encoded data ED received at the same timing to the end of the reception buffer 29 in arbitrary order in this way is also included in storing the received plurality of pieces of encoded data ED in order of the reception.

The received-packet analysis processing unit 26 outputs, to the encoded-data management unit 27, the frame ID and the storage destination ID in association with each other.

The storage destination ID is an index or a memory address itself in the reception buffer 29 in which the encoded data ED has been stored.

In the present disclosure, in a storage device such as a buffer, arbitrary information capable of identifying a storage area in which data has been stored is described as an address of the storage area. That is, also the storage destination ID is included in the address of the storage area in which the encoded data ED has been stored.

The encoded-data management unit 27 stores, in the ID buffer 30, the frame ID received from the received-packet analysis processing unit 26 in order according to the playback order (order of the frame IDs #1 to #N). At this time, the encoded-data management unit 27 records also the storage destination ID associated with the frame ID, together with the frame ID.

Therefore, in this embodiment, the address (storage destination ID) of the storage area of the reception buffer 29 in which each of the plurality of pieces of encoded data ED has been stored is stored in order of playing back the plurality of pieces of frame data FD.

Figure 9:
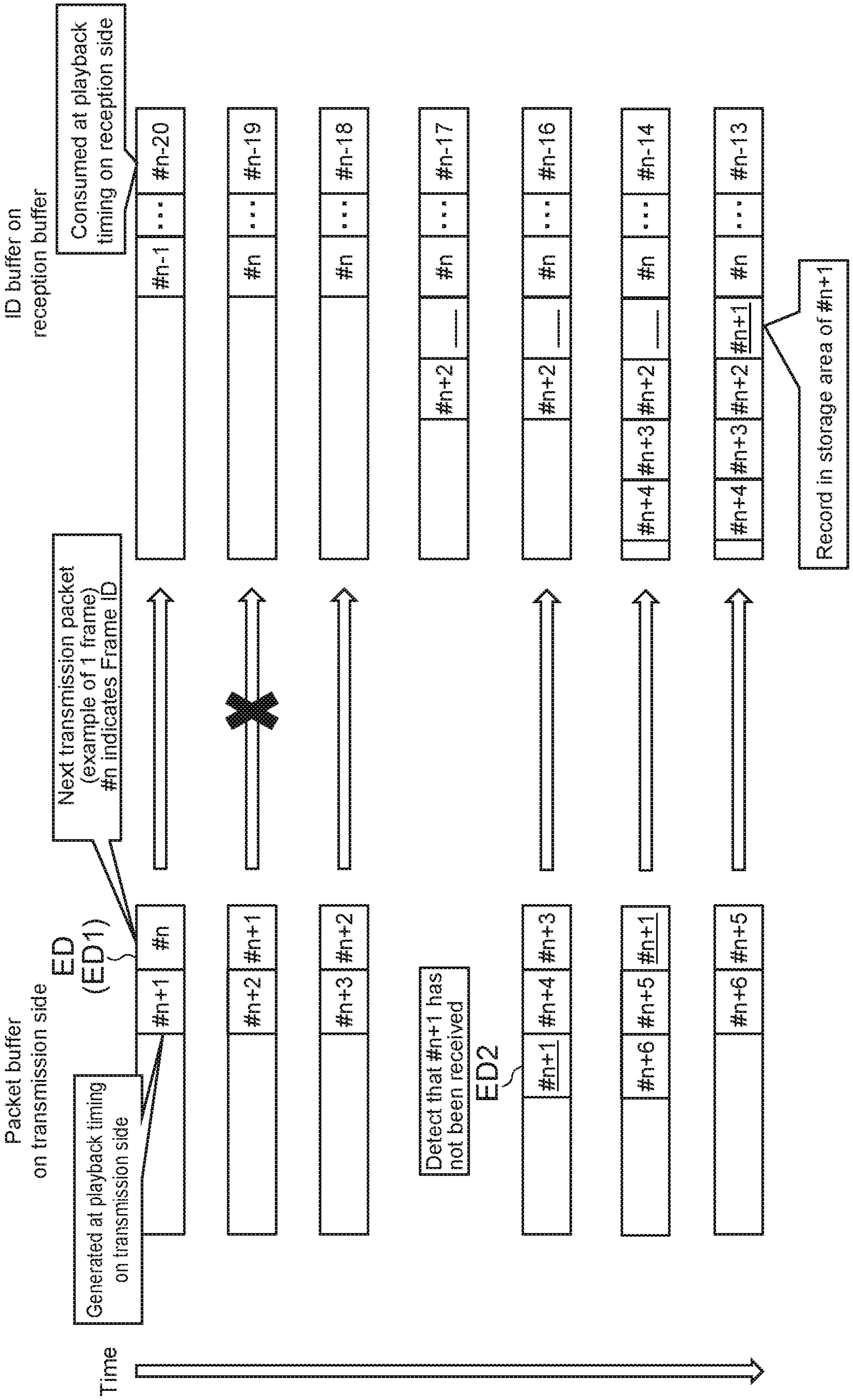
FIG. 9 is a schematic diagram for describing a method of storing a frame ID and a storage destination ID.

FIG. 9 is a schematic diagram for describing a method of storing a frame ID and a storage destination ID.

In the example shown in FIG. 9, for the sake of clarity, a case where one piece of encoded data ED is stored in a packet will be taken as an example.

For example, the difference between the value of the frame ID registered last time (value of #n) and the value of the frame ID received this time is calculated.

In the case where the transmission state is favorable, since the encoded data ED is received in order according to the playback order (order of the frame IDs #1 to #N), the difference between frame IDs is one. In the case where the difference between frame IDs is one, the frame ID and the storage destination ID received this time are stored in the storage area adjacent to the storage area in which the frame ID and the storage destination ID have been stored last time.

Meanwhile, in the case where the transmission state is not favorable, wireless transmission of a packet fails in some cases. That is, wireless transmission of transmission encoded data stored in a packet fails in some cases. In such a case, the difference between frame IDs is two or more in some cases.

In the case where the difference between frame IDs is two or more, the storage area corresponding to the magnitude of the difference is made free and the frame ID and the storage destination ID received this time are stored.

In the example shown in FIG. 9, transmission of the encoded data ED of ID (#n+1) fails. Therefore, when the encoded data ED of ID (#n+2) is received, the difference between frame IDs is two. At this time, a storage area corresponding to one is made free and the frame ID (#n+2) and the storage destination ID are stored.

As described above, in this embodiment, the re-encoding and wireless retransmission of the encoded data ED are executed. Therefore, the encoded data ED that has not been received is received later in some cases. In this case, a frame ID having a value smaller than that of the frame ID registered last time will be received.

In the case where a frame ID having a value smaller than that of the frame ID registered last time has been received, the storage area made free for storing the frame ID is searched for, and the frame ID and the storage destination ID received this time are stored.

In the example shown in FIG. 9, the frame data FD of the frame ID (#n+1) is re-encoded and retransmitted as the encoded data ED (re-encoded data ED2) of the frame ID (#n+1). The storage area for storing the frame ID (#n+1) and the storage destination ID is searched for, and the frame ID (#n+1) and the storage destination ID are stored in the searched storage area.

By making a storage area free for the encoded data ED that has not been received in this way, it is possible to easily insert and store the encoded data ED having the previous or following frame ID when receiving them later. That is, it is possible to easily store the frame ID and the storage destination ID in order according to the playback order (order of the frame IDs #1 to #N).

Note that storing the frame ID and the storage destination ID in order according to the playback order (order of the frame IDs #1 to #N) corresponds to an embodiment of the method of storing, on the basis of the frame ID corresponding to each of the plurality of pieces of encoded data ED, the address of the storage area in which each of the plurality of pieces of encoded data ED is stored.

Further, the encoded-data management unit 27 deletes, from the reception buffer 29, the encoded data ED decoded by the decoding processing unit 28. Further, the encoded-data management unit 27 deletes, from the ID buffer 30, the frame ID of the encoded data ED and the storage destination ID decoded by the decoding processing unit 28.

For example, it is also possible to determine, when the decoding processing unit 28 has acquired the encoded data ED from the reception buffer 29, that the encoded data ED has been decoded.

Therefore, in accordance with the acquisition of the encoded data ED by the decoding processing unit 28 from the reception buffer 29, the acquired encoded data ED may be discarded from the reception buffer 29. Further, in accordance with the acquisition of the encoded data ED by the decoding processing unit 28 from the reception buffer 29, the frame ID and the storage destination ID may be discarded from the ID buffer 30. Then, the corresponding storage area of the ID buffer 30 may be cleared to zero.

The encoded-data management unit 27 refers to the ID buffer 30 to read the storage destination ID of the encoded data ED to be decoded next. Then, by controlling a switch 31, the encoded data ED stored in the storage destination ID and the decoding processing unit 28 are connected to each other.

In this embodiment, a frame ID and a storage destination ID are stored in order according to the playback order (order of IDs (#1 to ∩N)). Therefore, the encoded-data management unit 27 reads the storage destination ID in order from the storage area at the head of the ID buffer 30, making it possible to connect the encoded data ED to the decoding processing unit 28 in accordance with the playback order.

That is, it is possible to output the encoded data ED stored in the reception buffer 29 to the decoding processing unit 28 in accordance with the playback order without executing processing of searching the storage destination ID associated with the frame ID for the ID buffer 30.

Note that assumption is made that there is the encoded data ED that has not been received. In this case, there is a storage area in which a frame ID and a storage destination ID are not stored.

In the case where a frame ID and a storage destination ID are not stored, the encoded-data management unit 27 is also capable of notifying the decoding processing unit 28 of that there is the encoded data ED that has not been received, for example, by opening the switch 31.

The decoding processing unit 28 acquires the encoded data ED from the reception buffer 29 and notifies the encoded-data management unit 27 of that fact. Further, the decoding processing unit 28 decodes the acquired encoded data ED and outputs the decoded encoded data ED to an audio playback system (not shown).

The specific decoding method and the like for decoding encoded data are not limited, and an arbitrary decoding method corresponding to the encoding method may be used.

The decoding processing unit 28 may execute, in the case of receiving information indicating that there is the encoded data ED that has not been received, processing such as concealing the missing of the frame data FD by error concealment processing or the like.

The functions of the respective blocks shown in FIG. 8 according to an embodiment of the present technology will be described.

The reception processing unit 25 functions as an embodiment of the reception unit according to the present technology. The reception processing unit 25 receives the plurality of pieces of encoded data ED generated by encoding the plurality of pieces of frame data FD to be wirelessly transmitted, a frame ID being assigned to each of the plurality of pieces of frame data FD. Further, the reception processing unit 25 receives transmission encoded data that includes one or more pieces of the encoded data ED and falls within the transmission-unit of wireless transmission.

The reception buffer 29 and the received-packet analysis processing unit 26 function as an embodiment of the first storage unit according to the present technology. Further, the first storage unit 7 shown in FIG. 1 is realized by the reception buffer 29 and the received-packet analysis processing unit 26.

The ID buffer 30 and the encoded-data management unit 27 function as an embodiment of the second storage unit according to the present technology. Further, the second storage unit 8 shown in FIG. 1 is realized by the ID buffer 30 and the encoded-data management unit 27.

The encoded-data management unit 27 and the decoding processing unit 28 function as an embodiment of the decoding unit according to the present technology. Further, the decoding unit 9 shown in FIG. 1 is realized by the encoded-data management unit 27 and the decoding processing unit 28. That is, in the example shown in FIG. 8, the encoded-data management unit 27 functions as both the second storage unit and the decoding unit.

[Operation Example of Reception Apparatus]

First, an example of a basic operation relating to reception of data and decoding by the reception apparatus 2 will be described.

Initialization processing is executed on each block shown in FIG. 1.

(Reception Processing)

The reception processing unit 25 outputs the received packet to the received-packet analysis processing unit 26.

The received-packet analysis processing unit 26 adds the plurality of pieces of encoded data ED stored in the packet to the end of the reception buffer 29. Further, the received-packet analysis processing unit 26 outputs, to the encoded-data management unit 27, the frame ID of each of the plurality of pieces of encoded data ED stored in the packet.

The encoded-data management unit 27 stores, in the ID buffer 30, the frame ID received from the received-packet analysis processing unit 26 in order according to the playback order in association with the storage destination ID of the encoded data ED. A storage area is made free for the encoded data ED that has not been received.

(Decoding Processing)

The encoded-data management unit 27 reads the storage destination ID from the head of the ID buffer 30 and controls the switch 31. Then, the encoded data ED stored in the storage area of the read storage destination ID is connected to the decoding processing unit 28.

The decoding processing unit 28 acquires and decodes the encoded data ED. Further, the decoding processing unit 28 notifies the encoded-data management unit 27 of that the encoded data ED has been acquired.

The encoded-data management unit 27 discards the acquired encoded data ED from the reception buffer 29. Further, the acquired frame ID of the encoded data ED and the storage destination ID are discarded from the ID buffer 30.

Regarding the encoded data ED that has not been received, the decoding processing unit 28 is notified of information indicating that the encoded data ED has not been received, by controlling the switch 31.

[Processing Example by Reception Apparatus]

A specific processing example by the reception apparatus 2 will be described.

In this embodiment, the reception apparatus 2 independently executes each of reception processing and decoding processing. The respective processes are appropriately executed in synchronization with each other. As the method of synchronizing the respective processes, an arbitrary method may be used.

The transmission processing, the transmission monitoring processing, and the encoding processing are realized by cooperation of the respective blocks shown in FIG. 8.

[Reception Processing]

Figure 10:
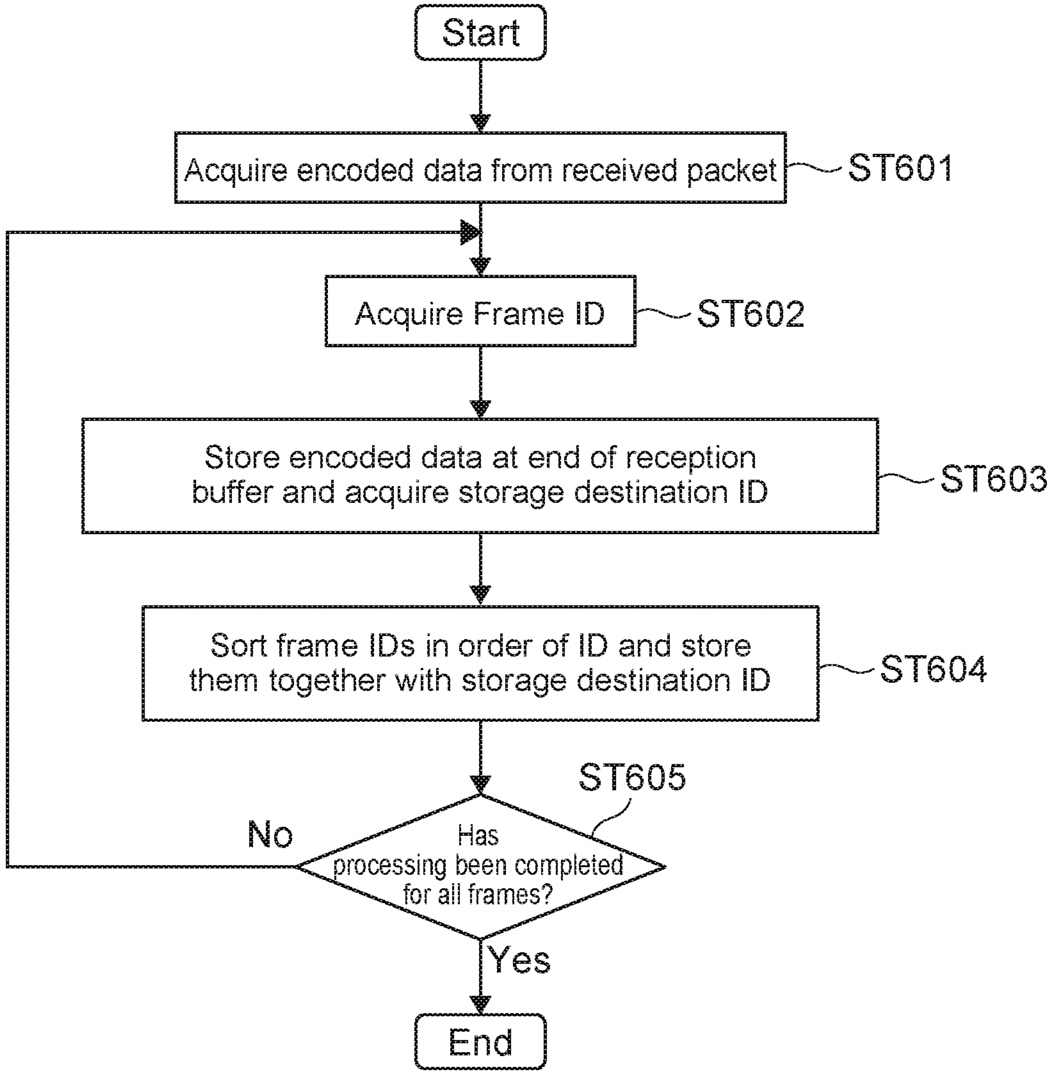
FIG. 10 is a flowchart showing an example of reception processing.

FIG. 10 is a flowchart showing an example of reception processing.

The reception processing is executed by the reception processing unit 25, the received-packet analysis processing unit 26, and the encoded-data management unit 27.

The reception processing is started, for example, at the timing when the Bluetooth module of the reception apparatus 2 received a packet.

The encoded data ED is acquired from the received packet and the number of pieces of encoded data ED is acquired (Step 601).

A frame ID is acquired in order for each piece of encoded data ED (Step 602).

Each piece of encoded data ED is stored in order at the end of the reception buffer 29 and a storage destination ID is acquired (Step 603).

The frame IDs are sorted in order of ID (in order according to the playback order) and are stored in the ID buffer 30 together with the storage destination ID (Step 604).

When processing is completed for all the encoded data ED acquired in Step 601, the reception processing ends (Step 605).

[Decoding Processing]

Figure 11:
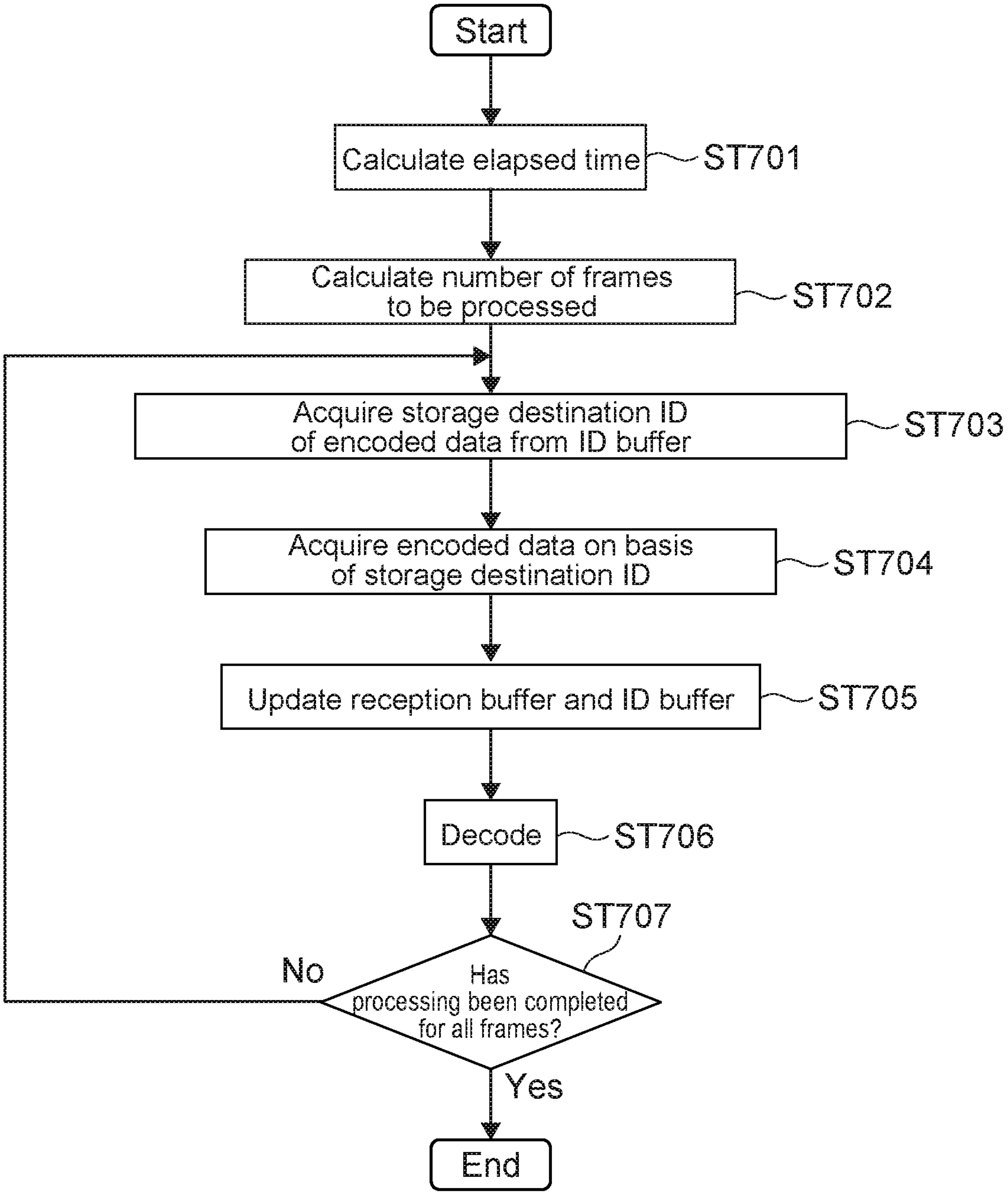
FIG. 11 is a flowchart showing an example of decoding processing.

FIG. 11 is a flowchart showing an example of decoding processing.

The decoding processing is executed by the encoded-data management unit 27 and the decoding processing unit 28.

For example, assumption is made that the decoding processing is started at regular intervals by a system (not shown).

The elapsed time since the previous startup is calculated (Step 701).

The number of pieces of encoded data ED to be processed is calculated on the basis of the elapsed time and the playback time (the one frame time) of one piece of encoded data ED that is a processing-unit (Step 702).

For example, in the case where the elapsed time is 20 ms and the one frame time is 5 ms, the number of frames to be processed this time is calculated to be four. Note that assumption is made that the elapsed time is not a multiple of the one frame time. In this case, although the time less than the one frame time will be left, but it will be decoded in this processing and deducted from the next elapsed time. It goes without saying that the present technology is not limited thereto.

The storage destination ID of the encoded data ED is acquired from the ID buffer 30 (Step 703).

The encoded data ED is acquired from the reception buffer 29 on the basis of the acquired storage destination ID (Step 704).

The reception buffer 29 and the ID buffer 30 are updated (Step 705).

For example, a memory address on the reception buffer 29 is acquired on the basis of the storage destination ID associated with the frame ID stored at the head of the ID buffer 30. Then, the encoded data ED is acquired from the reception buffer 29 on the basis of the memory address. Note that the memory address itself may be used as the storage destination ID.

After acquiring the encoded data ED, the head of the ID buffer 30 is updated by one and the data of the corresponding address of the reception buffer 29 is deleted.

The decoding processing is executed (Step 706).

When processing is completed for all the encoded data ED to be processed, the decoding processing ends (Step 707).

Note that in this embodiment, decoding is executed after acquiring the encoded data ED once from the reception buffer 29. The present technology is not limited thereto. The memory address on the reception buffer 29 may be directly passed to the decoding processing for decoding and the reception buffer 29 and the ID buffer 30 may be updated after the decoding is completed.

As described above, in the data transmission system 100 according to this embodiment, the transmission apparatus (encoding apparatus) 1 assigns a frame ID to each of the plurality of pieces of frame data FD. Then, the frame ID of the encoded data ED that needs to be regenerated is detected as the ID for regeneration, and the frame data FD to which the ID for regeneration has been assigned is re-encoded. As a result, it is possible to suppress the transmission error of encoded data.

Further, the reception apparatus (decoding apparatus) 2 receives the plurality of pieces of encoded data ED obtained by encoding the plurality of pieces of frame data FD, a frame ID being assigned to each of the plurality of pieces of frame data FD. The received encoded data ED is stored in a predetermined storage area of the first storage unit 7. The address of the storage area of the plurality of pieces of encoded data ED stored in the first storage unit 7 is stored in the second storage unit 8 on the basis of the frame ID. The decoding unit 9 reads, on the basis of the address stored in the second storage unit 8, the encoded data ED from the first storage unit 7 and decodes the read encoded data ED. As a result, it is possible to efficiently decode the received plurality of pieces of encoded data ED.

For example, in the case of wirelessly transmitting data in real time, it is necessary to take measures against transmission errors in order to suppress data loss due to transmission errors.

For example, in the Bluetooth standard, data is transmitted in packet-units. By executing retransmission processing by the transmission processing unit 16 shown in FIG. 2, it is possible to suppress transmission errors.

Meanwhile, in the case where limits such as the upper limit number of times and the upper limit time are set for the retransmission processing, the packet is discarded due to the limits even in transmission has not been correctly completed, resulting a transmission error in some cases.

It is possible to suppress transmission errors also by using the technology described in Patent Literature 1 (Japanese Patent No. 6540189) described above. In this technology, transmission errors are avoided by increasing the number of times of retransmission processing. Specifically, when it is detected that the environment is such that transmission errors frequently occur, the bit rate is reduced and more pieces of audio data are made contained in one packet. This widens the transmission intervals of the packet and increases the time allowed for retransmission.

However, in the case where limits are set for the retransmission processing, there is a possibility that the retransmission processing is terminated due to the limits even if the bit rate can be automatically controlled in accordance with the communication state.

By applying the present technology, it is possible to suppress transmission errors even in the case where the retransmission processing of a packet is terminated due to some limits.

For example, in the transmission apparatus 1, it is possible to detects the termination of the retransmission processing of a packet, specify the audio data contained in the packet discarded by the termination, re-encode this audio data at an optimal bit rate, and transmit the re-encoded audio data. As a result, it is possible to realize audio transmission with less interruption of sound.

Further, in the reception apparatus 2, even in the case where the encoded data ED is received in order different from the playback order, it is possible to efficiently decode the encoded data ED in order according to the playback order by managing the encoded data ED on the basis of the frame ID indicating the playback order.

By applying the present technology, for example, in a communications system in which data is communicated by packets, communication errors are compensated by retransmission, and a packet for retransmission is discarded after attempting retransmission for a certain period of time or a certain number of times, it is possible to detect a packet that has failed in communication and has been discarded (hereinafter, referred to as the discarded packet) and retransmit the audio data contained in this discarded packet.

Further, in a reception apparatus of the communications system, it is possible to store, in order of reception, the encoded data ED received in the changed playback order and store the address of the storage destination of the encoded data ED in accordance with the change amount of the frame ID (the difference between frame IDs) associated with the received encoded data ED. As a result, it is possible to decode the encoded data ED in order according to the playback order.

Further, in the communications system, it is also possible to manage the number of times of re-retransmission such that re-retransmission is not repeated more than a predetermined number of times determined in advance or determined by another system.

Further, in the communications system, it is also possible to manage the total time of re-retransmission such that re-retransmission is not repeated more than a predetermined time determined in advance or determined by another system.

Further, in the communications system, it is possible to store a certain signal processing result for generating a re-retransmission packet. For example, as in the example shown in FIG. 2, it is possible to store, in the frame buffer 18, the frame data FD whose transmission has not been completed. As a result, it is possible to efficiently execute re-encoding.

Further, in the communications system, when retransmitting the audio data contained in the detected discarded packet, it is possible to make a new packet preferentially contain the audio data to generate a re-retransmission packet. As a result, it is possible to suppress interruption of sound due to transmission errors.

Further, in the communications system, when retransmitting the audio data contained in the detected discarded packet, it is possible to make, in the case where there is a sufficient free space after making a new packet contain the audio data, the packet contains non-retransmission audio data to generate a re-retransmission packet. As a result, it is possible to make a packet efficiently contain audio data and transmit the packet, resulting in suppression of transmission errors.

Further, in the communications system, it is possible to adjust the bit rate of retransmission/non-retransmission audio data in accordance with the size of the re-retransmission packet. As a result, it is possible to make a packet efficiently contain audio data and transmit the packet, resulting in suppression of transmission errors.

Further, by applying the present technology, the possibility that the audio data that could not be transmitted by the retransmission processing can be transmitted increases. Further, it is possible to easily manage data on the side of the reception apparatus.

Second Embodiment

Regarding details of the transmission apparatus 1 and the reception apparatus 2 shown in FIG. 1, a second embodiment will be described.

In the following description, the difference from the embodiment described above will be mainly described, and description of configurations and operations similar to those of the transmission apparatus 1 and the reception apparatus 2 described in the above embodiment will be omitted or simplified.

In this embodiment, the packet loss is monitored on the side of the reception apparatus 2. Then, in the case where a packet loss occurs, the side of the transmission apparatus 1 is notified of that fact.

For example, the reception apparatus 2 detects the encoded data ED whose reception has failed and notifies the transmission apparatus 1 that transmits the plurality of pieces of encoded data ED of information relating to the detected encoded data ED.

The information relating to the encoded data ED whose reception has failed is typically a frame ID. Another type of information may be provided.

On the side of the transmission apparatus 1, the re-retransmission processing is started by the notification from the reception apparatus 2 as a trigger.

That is, in this embodiment, the detection unit 5 shown in FIG. 1 detects identification information for regeneration (the ID for regeneration) on the basis of the notification from the reception apparatus 2 that receives the plurality of pieces of encoded data ED.

For example, the detection unit 5 detects, on the basis of the notification including information (e.g., a frame ID) relating to the encoded data ED whose reception has failed from the reception apparatus 2 that receives the plurality of pieces of encoded data ED, the frame ID of the encoded data ED whose reception has failed as the ID for regeneration.

[Configuration Example of Reception Apparatus]

Figure 12:
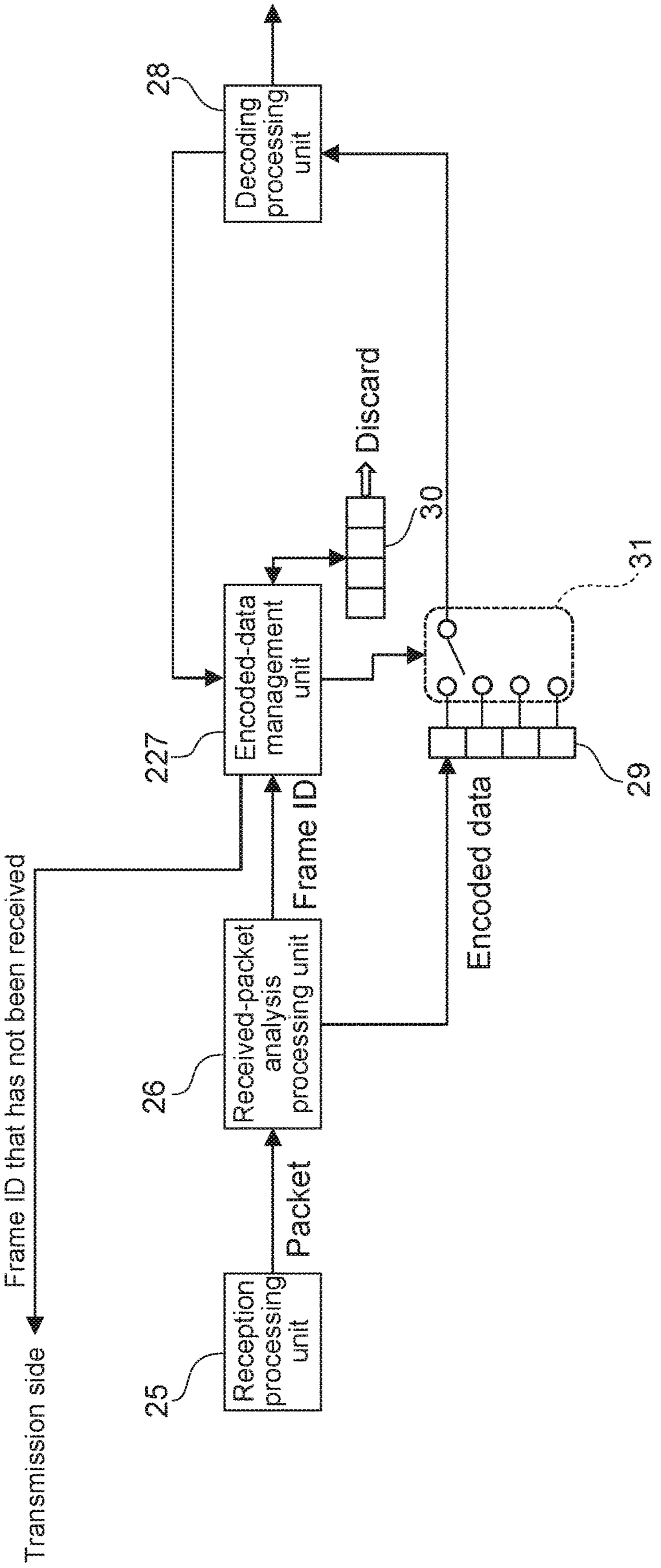
FIG. 12 is a block diagram showing a functional configuration example of a reception apparatus.

FIG. 12 is a block diagram showing a functional configuration example of the reception apparatus 2.

Figure 13:
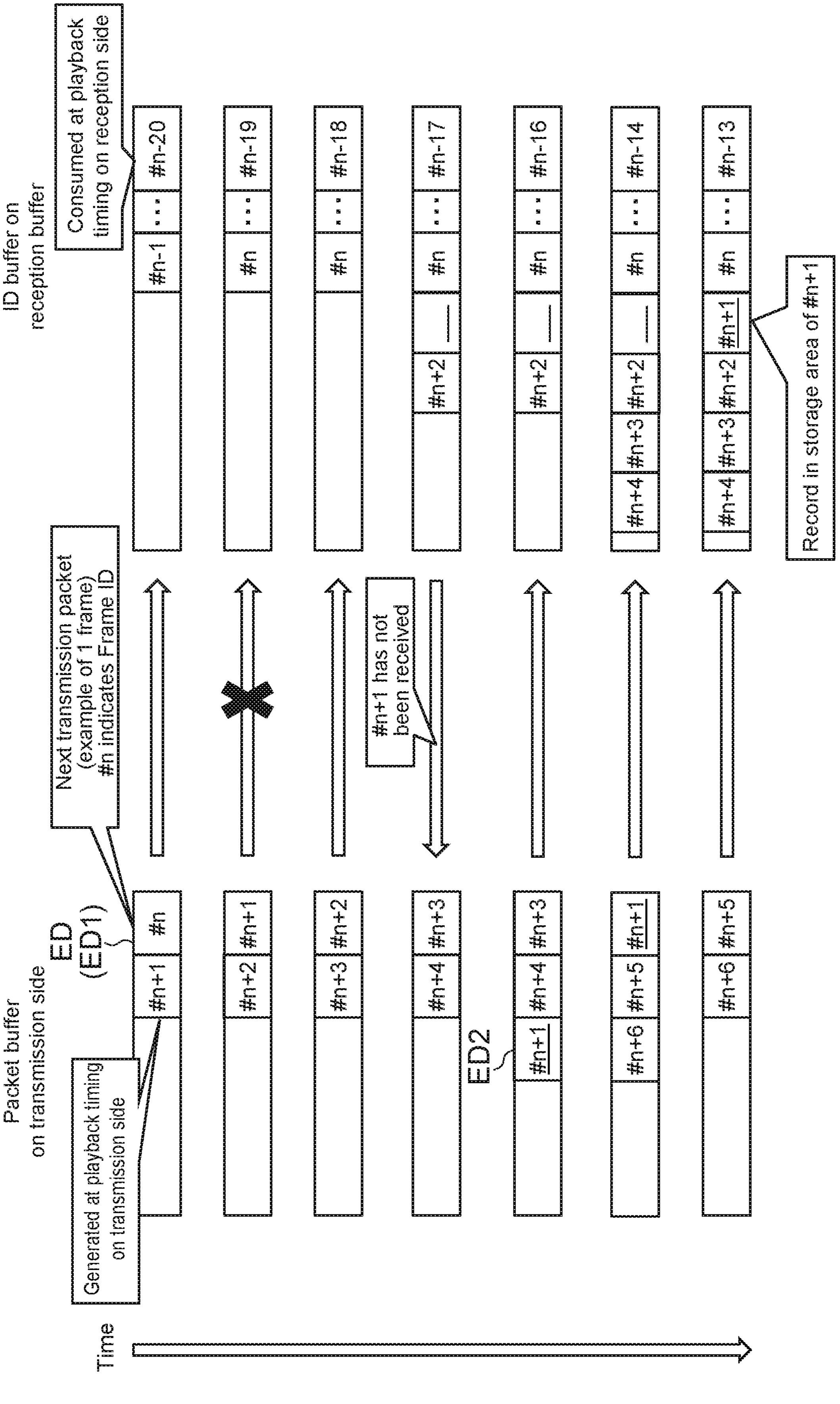
FIG. 13 is a schematic diagram for describing a method of storing a frame ID and a storage destination ID.

FIG. 13 is a schematic diagram for describing a method of storing a frame ID and a storage destination ID.

Also in this embodiment, as shown in FIG. 13, an encoded-data management unit 227 stores, in the ID buffer 30, a frame ID and a storage destination ID in the playback order.

Meanwhile, in this embodiment, in the case where a frame ID and a storage destination ID have not been recorded or cleared to zero, a frame ID and a storage destination ID are stored. That is, in the case where a frame ID and a storage destination ID have already been stored or not been cleared to zero, a frame ID and a storage destination ID are not stored.

Further, the encoded-data management unit 227 checks, on the basis of the state of the ID buffer 30, the encoded data ED that has not been received. Then, in the case where there is the encoded data ED that has not been received, processing of notifying the transmission apparatus 1 of the frame ID of the encoded data ED that has not been received is executed.

For example, in the example shown in FIG. 13, the encoded data ED of a frame ID (#n+2) is received, and it is determined that the encoded data ED of a frame ID (#n+1) has not been received at the timing when the frame ID (#n+2) was recorded. Then, the transmission apparatus 1 is notified of the frame ID (#n+1) as a frame ID that has not been received.

Note that the number of frame IDs that have not been received to be provided to the transmission apparatus 1 is one in some cases and is two or more in some cases. For example, it is also possible to collectively provide frame IDs that have not been received, with pre-designed granularity.

As a method of providing a plurality of frame IDs that has not been received, there is a method of providing each of a plurality frame IDs that have not been received.

In the case where the plurality of frame IDs that has not been received is continuous, the minimum value and the maximum value of the frame ID may be provided. That is, information of a predetermined section in the data ACD of audio content may be provided as information relating to the encoded data ED that has not been received.

Further, assumption is made that the plurality of frame IDs that has not been received is not continuous and there is the encoded data ED that has already been received in the section defined by the minimum value and the maximum value of the frame ID that has not been received. In this case, in the case where the ratio of the encoded data ED that has not been received to the plurality of pieces of encoded data ED included in the section is larger than a predetermined ratio, the maximum value and the minimum value of the frame ID that has not been received, including the encoded data ED that has already been received, may be provided as information relating to the encoded data ED that has not been received.

Alternatively, in the case where the ratio of the encoded data ED that has already been received to the plurality of pieces of encoded data ED included in the section is smaller than a predetermined ratio, the maximum value and the minimum value of the frame ID that has not been received, including the encoded data ED that has already been received, may be provided as information relating to the encoded data ED that has not been received.

In this case, not only the encoded data ED that has not been received but also the encoded data ED that has already been received is retransmitted from the transmission apparatus 1.

In the case where the encoded data ED that has already been received is retransmitted and the encoded data ED that has been received first is used, the encoded data ED that has been received again is discarded from the reception buffer 29.

Note that in the case where the time until decoding processing is short for the encoded data ED that has not been received, processing of not notifying the transmission apparatus 1 is possible.

Further, if the frame ID that has not been received is frequently provided, there is a possibility that wireless transmission from the transmission apparatus 1 to the reception apparatus 2 is affected. Therefore, in order to suppress the affection, for example, processing of not providing again, until a predetermined number (e.g., 3) of packets is received thereafter, the frame ID that has not been received but has been provided once is also effective.

Further, limits may be set for the number of times that the frame ID that has not been received is provided.

In this embodiment, the encoded-data management unit 227 functions as a detection unit that detects, on the basis of the identification information, encoded data whose reception has failed.

Further, the encoded-data management unit 227 functions also as a notification unit that notifies an apparatus that transmits the plurality of pieces of encoded data of information relating to the detected encoded data whose reception has failed.

[Configuration Example of Transmission Apparatus]

Figure 14:
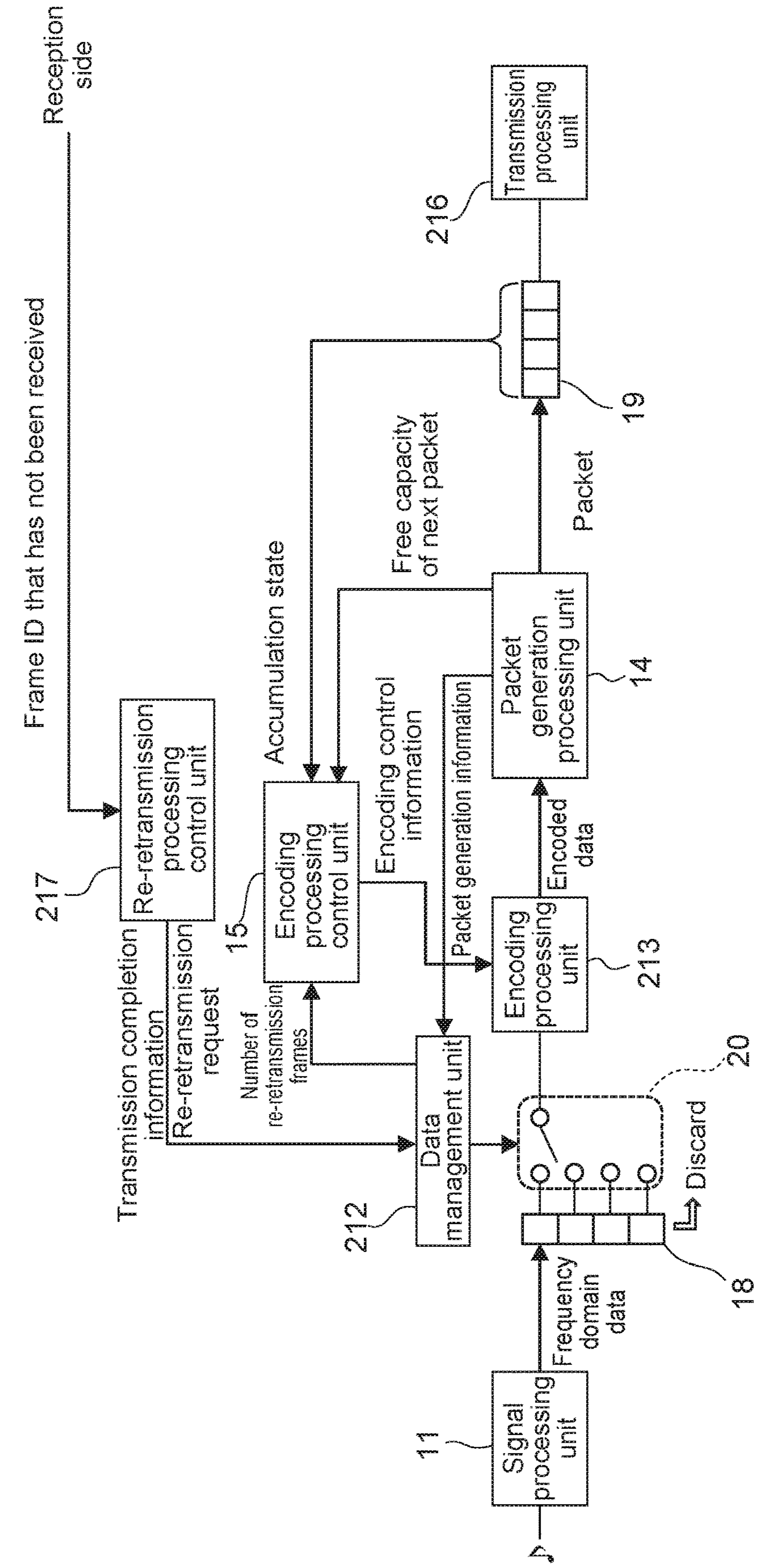
FIG. 14 is a block diagram showing a functional configuration example of a transmission apparatus.

FIG. 14 is a block diagram showing a functional configuration example of the transmission apparatus 1.

In this embodiment, a re-retransmission processing control unit 217 outputs, at the timing of acquiring the frame ID that has not been received provided from the reception apparatus 2, a retransmission request including the frame ID that has not been received to a data management unit 212.

The data management unit 212 controls the switch 20 to connect the corresponding frame data FD to an encoding processing unit 213 with the received frame ID that has not been received as the ID for regeneration, similarly to the first embodiment.

Note that in the example shown in FIG. 14, a transmission result is not output from a transmission processing unit 216 to the re-retransmission processing control unit 217. In the case of adopting such a configuration, for example, processing of discarding the frame data FD from the frame buffer 18 after a certain period of time may be executed.

It goes without saying that a transmission result may be output from the transmission processing unit 216 to the re-retransmission processing control unit 217 and the frame data FD whose transmission has succeeded may be discarded from the frame buffer 18, similarly to the first embodiment.

[Processing Example by Transmission Apparatus]

In this embodiment, the transmission apparatus 1 independently executes each of the transmission processing, the reception processing, and the encoding processing. The respective processes are appropriately executed in synchronization with each other. As the method of synchronizing the respective processes, an arbitrary method may be used.

The transmission processing, the transmission monitoring processing, and the encoding processing are realized by cooperation of the respective blocks shown in FIG. 14.

The transmission processing is processing substantially similar to that in the first embodiment and description thereof will be omitted.

[Reception Processing]

Figure 15:
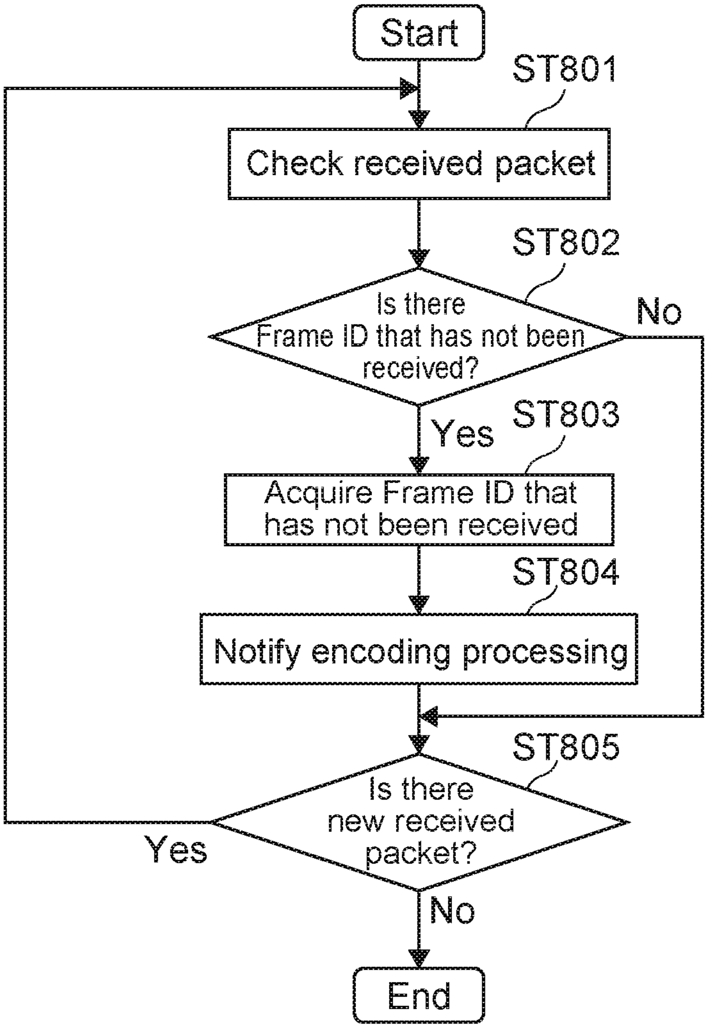
FIG. 15 is a flowchart showing an example of reception processing.

FIG. 15 is a flowchart showing an example of reception processing.

In this embodiment, the reception processing is started at the timing of acquiring a packet transmitted from the side of the reception apparatus 2.

Whether or not the received packet includes the frame ID that has not been received is determined (Steps 801 and 802).

In the case where the packet includes the frame ID that has not been received (Yes in Step 802), the frame ID that has not been received is acquired and provided to the encoding processing (Steps 803 and 804).

In the case where there is no newly-received packet, the reception processing ends. IN the case where there is a newly-received packet, similar processing is repeated again (Step 805).

[Encoding Processing]

Figure 16:
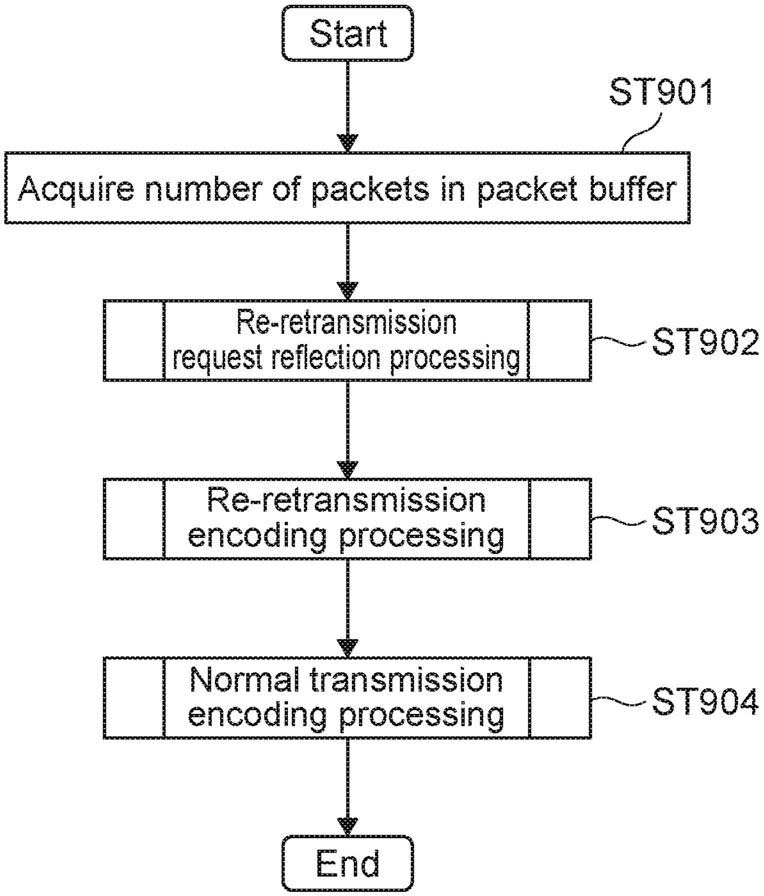
FIG. 16 is a flowchart showing an example of a flowchart showing an example of encoding processing.

FIG. 16 is a flowchart showing an example of a flowchart showing an example of encoding processing.

The number of packets in the packet buffer 19 is acquired (Step 901).

Re-retransmission request reflection processing is executed and the frame ID that has not been received provided from the reception processing is reflected as the ID for regeneration (Step 902).

Re-retransmission encoding processing is executed and frame data that needs to be re-encoded is processed (Step 903).

Finally, normal transmission encoding processing is executed and frame data to be normally transmitted (corresponding to initial transmission) is processed (Step 904).

The re-retransmission request reflection processing checks whether or not there is the frame ID that has not been received provided from the reception processing and specifies, in the case where there is such a frame ID, the corresponding frame data FD for the provision to determine whether to perform re-retransmission.

For example, in the case where the number of times of re-retransmission of the corresponding frame data FD is updated and the result of updating the number of times of re-retransmission is less than a specified number of times (the upper limit number of times), a re-retransmission flag (re-encoding flag) indicating that re-retransmission is necessary is enabled. Alternatively, the determination may be made on the basis of the upper limit time allowed for the re-retransmission processing.

The re-retransmission encoding processing and the normal transmission encoding processing are processes similar to those in the first embodiment, and description thereof will be omitted.

[Processing Example by Reception Apparatus]

A specific processing example by the reception apparatus 2 will be described.

In this embodiment, the reception apparatus 2 independently executes each of the reception processing and the decoding processing. The respective processes are appropriately executed in synchronization with each other. As the method of synchronizing the respective processes, an arbitrary method may be used.

The transmission processing, the transmission monitoring processing, and the encoding processing are realized by cooperation of the respective blocks shown in FIG. 12.

[Reception Processing]

Figure 17:
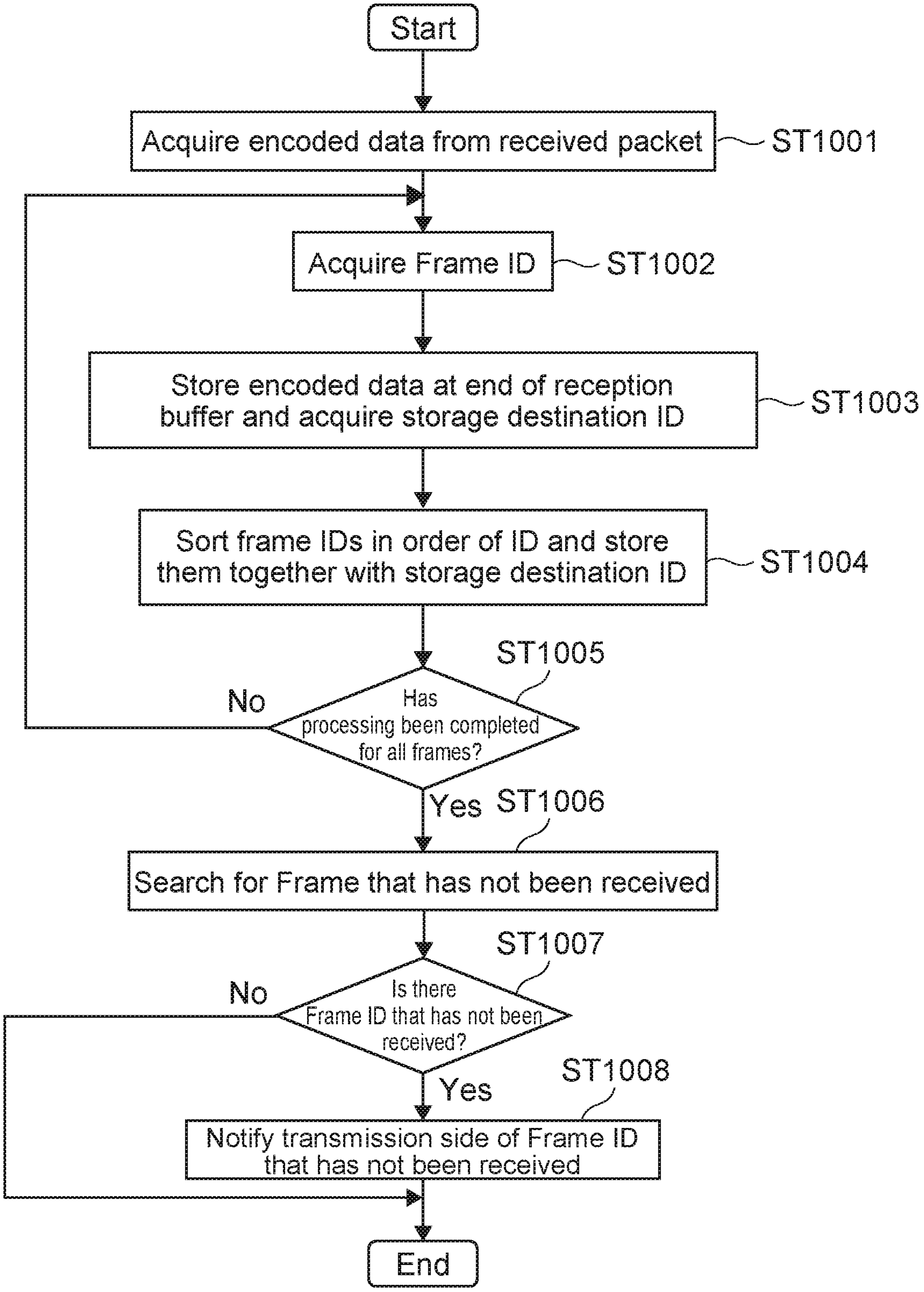
FIG. 17 is a flowchart showing an example of reception processing.

FIG. 17 is a flowchart showing an example of reception processing.

The reception processing is started, for example, at the timing when the Bluetooth module of the reception apparatus 2 received a packet.

Steps 1001 to 1005 are similar to those in the first embodiment.

By referring to the ID buffer 30, the frame ID that has not been received is searched for (Step 1006).

In the case where there is the frame ID that has not been received, the transmission apparatus 1 is notified of the frame ID that has not been received (Steps 1007 and 1008).

The decoding processing is processing similar to that in the first embodiment and description thereof will be omitted.

Also in this embodiment, it is possible to suppress transmission errors of the encoded data ED. Further, it is possible to efficiently decode the received plurality of pieces of encoded data ED.

In this embodiment, it is possible to specify the frame that has not been received or packet that has not been received in accordance with the change amount of the frame ID associated with the received encoded data ED (the difference between frame IDs) and notify the side of the transmission apparatus 1 of the specified frame or packet.

Further, in the reception apparatus 2, the pieces of encoded data ED that have not been received, which are to be transmitted to the side of the transmission apparatus 1, can be collectively provided with pre-designed granularity. As a result, it is possible to suppress the influence on the wireless transmission from the transmission apparatus 1 to the reception apparatus 2.

Further, in the reception apparatus 2, in the case where the ratio of the frame that has not been received exceeds a pre-designed ratio in a specific section of content data ACD or the ratio of the received frame is less than a pre-designed ratio, notification of the section can be executed including the received frame.

Other Embodiments

The present technology is not limited to the embodiment described above, and various other embodiments can be realized.

In the above, data of audio content has been taken as an example of data to be transmitted. The present technology is not limited thereto and can be applied also to data of video content. Further, the present technology can be applied also to data other than content data.

Further, as the method of detecting identification information of frame data that needs to be re-encoded, the method described in the first embodiment and the method described in the second embodiment may be combined with each other. For example, both a function of detecting, as identification information for regeneration, identification information corresponding to the encoded data whose transmission has failed on the transmission apparatus side and a function of detecting identification information for regeneration by notification from a reception apparatus may be provided.

Figure 18:
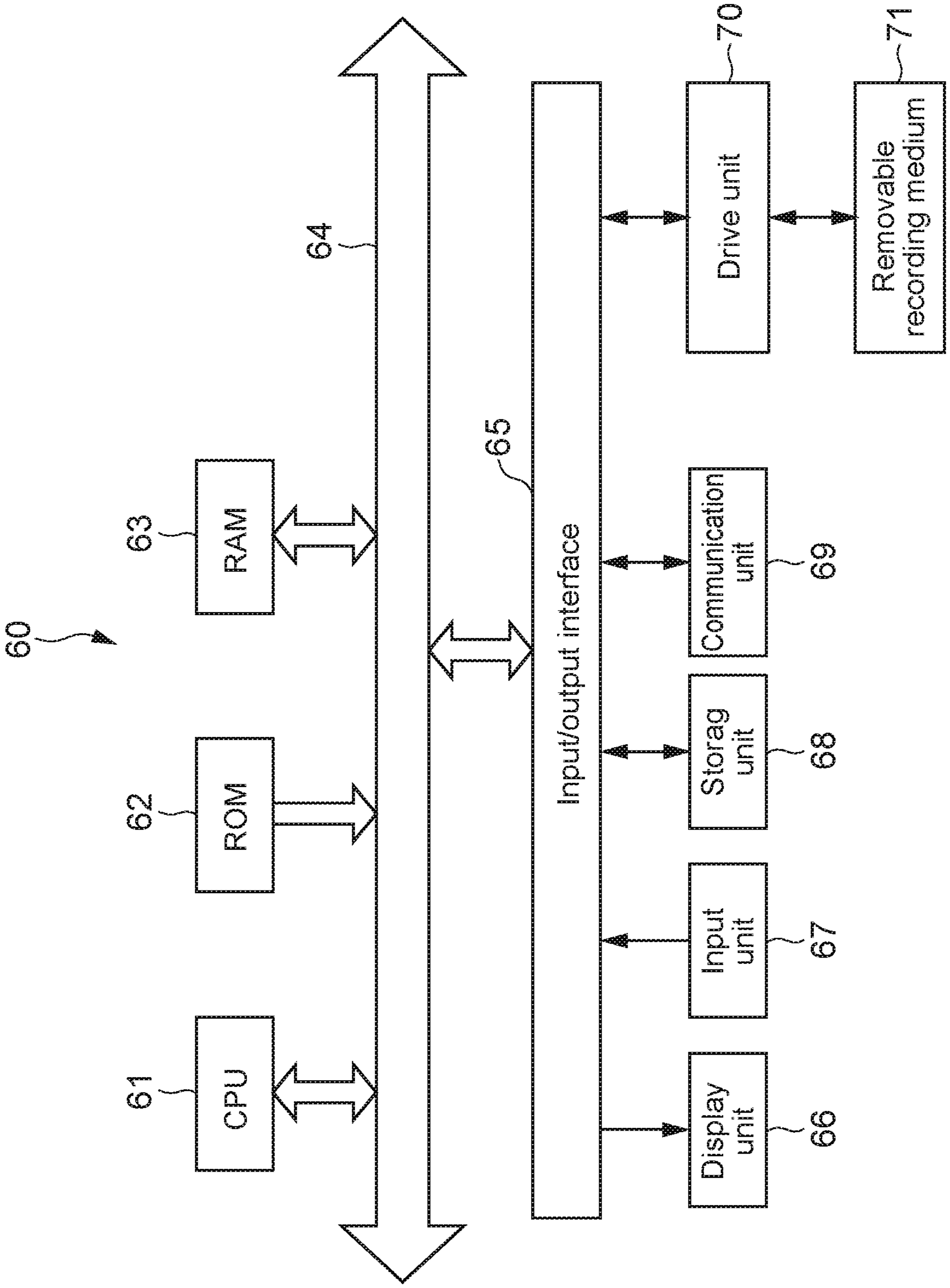
FIG. 18 is a block diagram showing a hardware configuration example of a computer (information processing apparatus) capable of realizing a transmission apparatus and a reception apparatus.

FIG. 18 is a block diagram showing a hardware configuration example of a computer (information processing apparatus) 60 capable of realizing the transmission apparatus 1 and the reception apparatus 2.

The computer 60 includes a CPU 61, a ROM (Read Only Memory) 62, a RAM 63, an input/output interface 65, and a bus 64 that connect them to each other. A display unit 66, an input unit 67, a storage unit 68, a communication unit 69, a drive unit 70, and the like are connected to the input/output interface 65.

The display unit 66 is, for example, a display device that uses liquid crystal, EL, or the like. The input unit 67 is, for example, a keyboard, a pointing device, a touch panel, or another operation device. In the case where the input unit 67 includes a touch panel, the touch panel can be integrated with the display unit 66.

The storage unit 68 is a non-volatile storage device and is, for example, an HDD, a flash memory, or another solid-state memory. The drive unit 70 is, for example, a device capable of driving a removable recording medium 71 such as an optical recording medium and a magnetic recording tape.

The communication unit 69 is a modem, router, or another communication device for communication with another device, which can be connected to LAN, WAN, or the like. The communication unit 69 may perform communication using wired or wireless communication. The communication unit 69 is often used separately from the computer 60.

The information processing by the computer 60 having the hardware configuration described above is realized by cooperation of software stored in the storage unit 68, the ROM 62, or the like, and the hardware resources of the computer 60. Specifically, a program constituting software stored in the ROM 62 or the like is loaded in the RAM 63 and executed, thereby realizing the information processing method according to the present technology.

The program is installed in the computer 60 via, for example, the recording medium 61. Alternatively, the program may be installed in the computer 60 via a global network or the like. In addition, an arbitrary computer-readable non-transient recording medium may be used.

The information processing method (the encoding method and the decoding method) and the program according to the present technology may be executed and the information processing apparatus (the encoding apparatus and the decoding apparatus) according to the present technology may be constructed by causing a plurality of computers communicably connected to each other via a network or the like to cooperate with each other.

That is, the information processing method and the program according to the present technology can be executed not only in a computer system configured by a single computer but also in a computer system in which a plurality of computers operates in conjunction with each other.

Note that, in the present disclosure, the system means an aggregate of a plurality of components (such as apparatuses and modules (parts)) and it does not matter whether or not all the components are housed in the same casing. Therefore, a plurality of apparatuses housed in separate casings and connected to each other through a network, and one apparatus in which a plurality of modules is housed in one casing are both the system.

Execution of the information processing method and the program according to the present technology by a computer system includes, for example, both the case where assignment of identification information, generation of encoded data, detection of identification information for regeneration, reception of encoded data, storage of encoded data, storage of an address, decoding of encoded data, and the like are executed by a single computer and the case where the respective processes are executed by different computers. Further, execution of the respective processes by a predetermined computer includes causing another computer to execute some or all of those processes and acquiring results thereof.

That is, the information processing method and the program according to the present technology are also applicable to a configuration of cloud computing in which a plurality of apparatuses shares one function and works collaboratively to perform the one function through a network.

The respective configurations of the data transmission system, the transmission apparatus, the reception apparatus, and the like described with reference to the drawings, each processing flow, and the like are merely an embodiment, and can be arbitrarily modified without departing from the essence of the present technology. That is, other arbitrary configurations, algorithms, and the like for implementing the present technology may be adopted.

In the present disclosure, in the case where the word "substantially" is used, it is used only to facilitate the understanding of description, and the use/non-use of the word "substantially" has no special meaning.

That is, in the present disclosure, concepts that define a shape, a size, a positional relationship, a state, and the like, such as "central", "middle", "uniform", "equal", "same", "orthogonal", "parallel", "symmetrical", "extended", "axial direction", "columnar shape", "cylindrical shape", "ring shape", and "annular shape", include "substantially central", "substantially middle", "substantially uniform", "substantially equal", "substantially the same", "substantially orthogonal", "substantially parallel", "substantially symmetrical", "substantially extended", "substantially axial direction", "substantially columnar shape", "substantially cylindrical shape", "substantially ring shape", "substantially annular shape", and the like.

For example, a state included in a predetermined range (e.g., a range of ±10%) based on "completely central", "completely middle", "completely uniform", "completely equal", "completely the same", "completely orthogonal", "completely parallel", "completely symmetrical", "completely extended", "completely axial direction", "completely columnar shape", "completely cylindrical shape", "completely ring shape", "completely annular shape", and the like is also included.

Therefore, even in the case where the word "substantially" is not added, a concept expressed by adding a so-called "substantially" can be included. On the contrary, the complete state is not excluded from the state expressed by adding "substantially".

In the present disclosure, expressions using "than" such as "larger than A" and "smaller than A" comprehensively include both the concept including the case where it is equivalent to A and the concept not including the case where it is equivalent to A. For example, the phrase "larger than A" is not limited to the case not including being equivalent to A and includes "A or more". Further, the phrase "smaller than A" is not limited to "less than A" and includes "A or less".

When implementing the present technology, specific setting and the like only need to be appropriately adopted from the concepts included in "larger than A" and "smaller than A" such that the effects described above are exhibited.

Of the feature portions according to the present technology described above, at least two feature portions can be combined. That is, the various feature portions described in the respective embodiments may be arbitrarily combined without distinguishing from each other in the respective embodiments. Further, the various effects described above are merely illustrative and are not limitative, and another effect may be exhibited.

Note that the present technology may also take the following configurations.

(1) A decoding apparatus, including:
- a reception unit that receives a plurality of pieces of encoded data generated by encoding a plurality of pieces of frame data to be wirelessly transmitted, identification information being assigned to each of the plurality of pieces of frame data;
- a first storage unit that stores each of the received plurality of pieces of encoded data in a predetermined storage area;
- a second storage unit that stores, on a basis of the identification information corresponding to each of the plurality of pieces of encoded data, an address of the storage area of the first storage unit in which each of the plurality of pieces of encoded data is stored; and
- a decoding unit that reads the encoded data from the first storage unit on a basis of the address stored in the second storage unit on a basis of the identification information, and decodes the read encoded data.

(2) The decoding apparatus according to (1), in which
- the plurality of pieces of frame data is data obtained by content data to be played back into a plurality of pieces,
- the identification information is information capable of identifying order of playing back the plurality of pieces of frame data,
- the first storage unit stores the received plurality of pieces of encoded data in order of the reception, and
- the second storage unit stores, in order of playing back the plurality of pieces of frame data, the address of the storage area in which each of the plurality of pieces of encoded data is stored.

(3) The decoding apparatus according to (1) or (2), in which
- the reception unit receives transmission encoded data that includes one or more pieces of encoded data and falls within a transmission-unit of the wireless transmission, and
- the first storage unit stores each of the one or more pieces of encoded data included in the received transmission encoded data.

(4) The decoding apparatus according to any one of (1) to (3), further including:
- a detection unit that detects, on a basis of the identification information, encoded data whose reception has failed; and a notification unit that notifies an apparatus that transmits the plurality of pieces of encoded data of information relating to the detected encoded data whose reception has failed.

(5) The decoding apparatus according to any one of (1) to (4), in which the first storage unit deletes the encoded data decoded by the decoding unit, and the second storage unit deletes an address of the storage area in which the encoded data decoded by the decoding unit has been stored.

(6) A decoding method executed by a computer system, including:

a reception step of receiving a plurality of pieces of encoded data generated by encoding a plurality of pieces of frame data to be wirelessly transmitted, identification information being assigned to each of the plurality of pieces of frame data;

a first storage step of storing each of the received plurality of pieces of encoded data in a predetermined storage area of a first storage unit;

a second storage step of storing, in a second storage unit on a basis of the identification information corresponding to each of the plurality of pieces of encoded data, an address of the storage area of the first storage unit in which each of the plurality of pieces of encoded data is stored; and a decoding step of reading, on a basis of the address stored in the second storage unit on a basis of the identification information, the encoded data from the first storage unit, and decoding the read encoded data.

(7) An encoding apparatus, including:

an assigning unit that assigns identification information to each of a plurality of pieces of frame data to be wirelessly transmitted;

an encoding unit that encodes each of the plurality of pieces of frame data to generate a plurality of pieces of encoded data; and a detection unit that detects, as identification information for regeneration, the identification information corresponding to the encoded data that needs to be regenerated of the generated plurality of pieces of encoded data, in which the encoding unit re-encodes the frame data to which the detected identification information for regeneration has been assigned.

(8) The encoding apparatus according to (7), in which the encoding unit re-encodes the frame data to which the identification information for regeneration has been assigned at a bit rate for re-encoding.

(9) The encoding apparatus according to (8), in which the encoding unit sets the bit rate for re-encoding on a basis of a transmission state of the wireless transmission.

(10) The encoding apparatus according to any one of (7) to (9), further including a transmission unit that wirelessly transmits the plurality of pieces of encoded data, in which the detection unit detects, as the identification information for regeneration, the identification information corresponding to the encoded data whose wireless transmission by the transmission unit has failed.

(11) The encoding apparatus according to any one of (7) to (10), further including a transmission unit that wirelessly transmits the plurality of pieces of encoded data, in which the detection unit detects, as the identification information for regeneration, the identification information corresponding to the encoded data discarded without being wirelessly transmitted.

(12) The encoding apparatus according to any one of (7) to (11), in which the detection unit detects the identification information for regeneration on a basis of notification from an apparatus that receives the plurality of pieces of encoded data.

(13) The encoding apparatus according to (12), in which the identification information of the encoded data whose reception has failed is detected as the identification information for regeneration on a basis of the notification including information relating to the encoded data whose reception has failed from the apparatus that receives the plurality of pieces of encoded data.

(14) The encoding apparatus according to any one of (7) to (13), in which the encoding unit generates transmission encoded data that includes one or more pieces of encoded data and falls within a transmission-unit of the wireless transmission, the transmission unit wirelessly transmits the transmission encoded data, and the detection unit detects, as the identification information for regeneration, the identification information corresponding to each of the one or more pieces of encoded data included in the transmission encoded data whose wireless transmission by the transmission unit has failed.

(15) The encoding apparatus according to (14), in which the encoding unit generates the transmission encoded data including re-encoded data and initially-encoded data, the re-encoded data being the encoded data generated by re-encoding by the encoding unit, the initially-encoded data being the encoded data generated by initial encoding by the encoding unit.

(16) The encoding apparatus according to (14) or (15), in which the encoding unit generates the transmission encoded data such that the re-encoded data is preferentially wirelessly transmitted.

(17) The encoding apparatus according to any one of (14) to (16), in which the plurality of pieces of frame data is data obtained by content data to be played back into a plurality of pieces, the identification information is information capable of identifying order of playing back the plurality of pieces of frame data, the encoding unit generates the transmission encoded data including a plurality of pieces of encoded data whose playback order is not continuous.

(18) The encoding apparatus according to any one of (7) to (17), further including:

a storage unit that stores the plurality of pieces of frame data; and an output control unit that controls an output of the frame data stored in the storage unit to the encoding unit.

(19) The encoding apparatus according to (18), in which the output control unit controls an output of the frame data to the encoding unit such that the frame data to which the detected identification information has been assigned is output to the encoding unit, and deletes, from the storage unit, the frame data corresponding to the encoded data whose wireless transmission by the transmission unit has succeeded.

(20) An encoding method executed by a computer system, including:

an assigning step of assigning identification information to each of a plurality of pieces of frame data to be wirelessly transmitted;

an encoding step of encoding each of the plurality of pieces of frame data to generate a plurality of pieces of encoded data; and a detection step of detecting, as identification information for regeneration, the identification information corresponding to the encoded data that needs to be regenerated of the generated plurality of pieces of encoded data, in which the encoding step includes re-encoding the frame data to which the detected identification information for regeneration has been assigned.

(21)

A program that causes a computer system to execute:

a reception step of receiving a plurality of pieces of encoded data generated by encoding a plurality of pieces of frame data to be wirelessly transmitted, identification information being assigned to each of the plurality of pieces of frame data;

a first storage step of storing each of the received plurality of pieces of encoded data in a predetermined storage area of a first storage unit;

a second storage step of storing, in a second storage unit on a basis of the identification information corresponding to each of the plurality of pieces of encoded data, an address of the storage area of the first storage unit in which each of the plurality of pieces of encoded data is stored; and a decoding step of reading, on a basis of the address stored in the second storage unit on a basis of the identification information, the encoded data from the first storage unit, and decoding the read encoded data.

(22)

A program that causes a computer system to execute an encoding method, the encoding method including:

an assigning step of assigning identification information to each of a plurality of pieces of frame data to be wirelessly transmitted;

an encoding step of encoding each of the plurality of pieces of frame data to generate a plurality of pieces of encoded data; and a detection step of detecting, as identification information for regeneration, the identification information corresponding to the encoded data that needs to be regenerated of the generated plurality of pieces of encoded data, in which the encoding step includes re-encoding the frame data to which the detected identification information for regeneration has been assigned.

(23) The encoding apparatus according to (14), in which the encoding unit generates the transmission encoded data including re-encoded data, the re-encoded data being the encoded data generated by re-encoding by the encoding unit.

(24) The encoding apparatus according to any one of (14) to (17) and (23), in which the encoding unit re-encodes the frame data to which the identification information for regeneration has been assigned at a bit rate for re-encoding, and sets the bit rate for re-encoding on a basis of the transmission-unit.

(25) The encoding apparatus according to any one of (7) to (19), (23), and (24), in which the wireless transmission is wireless transmission based on a BLE (Bluetooth Low Energy) standard.

(26) The encoding apparatus according to any one of (7) to (19) and (23) to (25), in which the frame data is audio data.

REFERENCE SIGNS LIST

ED encoded data
ED1 initially-encoded data
ED2 re-encoded data
FD frame data
1 transmission apparatus
2 reception apparatus
3 assigning unit
4 encoding unit
5 detection unit
7 first storage unit
8 second storage unit
9 decoding unit
11 signal processing unit
12, 212 data management unit
13, 213 encoding processing unit
14 packet generation processing unit
15 encoding processing control unit
16, 216 transmission processing unit
17, 217 re-retransmission processing control unit
18 frame buffer
19 packet buffer
20 switch
25 reception processing unit
26 received-packet analysis processing unit
27, 227 encoded-data management unit
28 decoding processing unit
29 reception buffer
30 ID buffer
31 switch
100 data transmission system

The invention claimed is:

1. A decoding apparatus, comprising:

a reception unit configured to receive, from an external apparatus, a first plurality of pieces of encoded data, wherein the first plurality of pieces of encoded data is generated based on an encoding process of a plurality of pieces of frame data, and identification information is assigned to each of the plurality of pieces of frame data;

a first storage unit configured to store each of the received first plurality of pieces of encoded data in a specific storage area;

a second storage unit configured to store a specific address of the specific storage area based on the identification information, wherein the identification information corresponds to each of the first plurality of pieces of encoded data that is stored at the specific address;

a decoding unit configured to:

read the first plurality of pieces of encoded data from the first storage unit based on the specific address;

decode the read first plurality of pieces of encoded data; and notify, the second storage unit, of the reception of the first plurality of pieces of encoded data, wherein the first storage unit is further configured to delete, based on the reception of the first plurality of pieces of encoded data, the read first plurality of pieces of encoded data decoded by the decoding unit, and the second storage unit is further configured to delete the specific address based on the notification;

a detection unit configured to detect a second plurality of pieces of encoded data based on the identification information, wherein the second plurality of pieces of encoded data is associated with a failure of the reception by the reception unit; and a notification unit configured to notify, based on the detected second plurality of pieces of encoded data, the external apparatus of specific information, wherein the specific information is associated with the detected second plurality of pieces of encoded data, based on the detected second plurality of pieces of encoded data that is continuous, the specific information includes a minimum value and a maximum value that are associated with the identification information, the reception unit is further configured to receive, based on the notified specific information, transmission encoded data that includes at least one piece of the first plurality of pieces of encoded data, and re-encoded data, the re-encoded data includes at least one piece of the second plurality of pieces of encoded data, the at least one piece of the second plurality of pieces of encoded data is re-encoded based on the notified specific information, and the transmission encoded data is within a transmission packet of a wireless transmission of the transmission encoded data.

2. The decoding apparatus according to claim 1, wherein the plurality of pieces of frame data is associated with a plurality of pieces of content data, the identification information indicates a playback order of the plurality of pieces of frame data, the first storage unit is further configured to store the received first plurality of pieces of encoded data in an order of the reception of the first plurality of pieces of encoded data, and the second storage unit is further configured to store the specific address of the specific storage area in the playback order of the plurality of pieces of frame data.

3. The decoding apparatus according to claim 1, wherein the first storage unit is further configured to store each of the at least one piece of the first plurality of pieces of encoded data and the at least one piece of the second plurality of pieces of encoded data that is re-encoded.

4. The decoding apparatus according to claim 1, wherein the identification information includes a plurality of frame IDs associated with the plurality of pieces of frame data, and the specific address of the specific storage area includes a storage destination ID.

5. A decoding method, comprising:

receiving, from an external apparatus, a first plurality of pieces of encoded data, wherein the first plurality of pieces of encoded data is generated based on encoding of a plurality of pieces of frame data, and identification information is assigned to each of the plurality of pieces of frame data;

storing each of the received first plurality of pieces of encoded data in a specific storage area of a first storage unit;

storing, in a second storage unit, a specific address of the specific storage area based on the identification information, wherein the identification information corresponds to each of the first plurality of pieces of encoded data that is stored at the specific address;

reading the first plurality of pieces of encoded data from the first storage unit based on the specific address;

decoding the read first plurality of pieces of encoded data;

notifying, the second storage unit, of the reception of the first plurality of pieces of encoded data;

deleting, based on the reception of the first plurality of pieces of encoded data, the read first plurality of pieces of encoded data that is decoded;

deleting the specific address of the specific storage area based on the notification;

detecting a second plurality of pieces of encoded data based on the identification information, wherein the second plurality of pieces of encoded data is associated with a failure of the reception of the first plurality of pieces of encoded data;

notifying, based on the detected second plurality of pieces of encoded data, the external apparatus of specific information, wherein the specific information is associated with the detected second plurality of pieces of encoded data, and based on the detected second plurality of pieces of encoded data that is continuous, the specific information includes a minimum value and a maximum value that are associated with the identification information; and receiving, based on the notified specific information, transmission encoded data that includes at least one piece of the first plurality of pieces of encoded data and re-encoded data, wherein the re-encoded data includes at least one piece of the second plurality of pieces of encoded data, the at least one piece of the second plurality of pieces of encoded data is re-encoded based on the notified specific information, and the transmission encoded data is within a transmission packet of a wireless transmission of the transmission encoded data.

6. An encoding apparatus, comprising:

an assigning unit configured to assign identification information to each of a plurality of pieces of frame data;

an encoding unit configured to initially encode each of the plurality of pieces of frame data to generate a plurality of pieces of encoded data;

a detection unit configured to:

detect the identification information that corresponds to a first set of the plurality of pieces of encoded data; and detect, based on the detected identification information, at least one piece of the plurality of pieces of encoded data, wherein the first set of the plurality of pieces of encoded data is regenerated, and the encoding unit is further configured to:

set a specific bit rate based on a size of a transmission packet of the first set of the plurality of pieces of encoded data; and re-encode, based on an enabled status of a re-retransmission flag, the first set of the plurality of pieces of encoded data at the specific bit rate, wherein the enabled status of the re-retransmission flag is associated with a storage size of an external apparatus, and the storage size is associated with the plurality of pieces of encoded data;

generate re-encoded data based on the re-encoded first set of the plurality of pieces of encoded data; and generate transmission encoded data that includes the at least one piece of the plurality of pieces of encoded data and at least one piece of the re-encoded first set of the plurality of pieces of encoded data; and a transmission unit configured to wirelessly transmit the transmission encoded data within a transmission packet of the wireless transmission of the transmission encoded data.

7. The encoding apparatus according to claim 6, wherein the encoding unit is further configured to set the specific bit rate based on a transmission state of a wireless transmission of the plurality of pieces of frame data.

8. The encoding apparatus according to claim 6, wherein the transmission unit is further configured to wirelessly transmit the plurality of pieces of encoded data, wherein the first set of the plurality of pieces of encoded data is associated with a failure of the wireless transmission of the plurality of pieces of encoded data.

9. The encoding apparatus according to claim 6, wherein the transmission unit is further configured to wirelessly transmit the plurality of pieces of encoded data, wherein the detection unit is further configured to detect, based on the identification information, a second set of the transmitted plurality of pieces of encoded data, and the second set of the transmitted plurality of pieces of encoded data is discarded.

10. The encoding apparatus according to claim 6, wherein the transmission unit is further configured to wirelessly transmit the plurality of pieces of encoded data to the external apparatus, wherein the detection unit is further configured to detect the identification information based on a notification from the external apparatus.

11. The encoding apparatus according to claim 10, wherein the identification information is associated with the first set of the plurality of pieces of encoded data, the first set of the plurality of pieces of encoded data is associated with a failure of a reception of the plurality of pieces of encoded data, and the first set of the plurality of pieces of encoded data is detected based on the notification.

12. The encoding apparatus according to claim 6, wherein the plurality of pieces of frame data is associated with a plurality of pieces of content data, the identification information indicates a playback order of the plurality of pieces of frame data, the encoding unit is further configured to generate the transmission encoded data that includes a second set of the plurality of pieces of encoded data, and a playback order of the second set of the plurality of pieces of encoded data is not continuous.

13. The encoding apparatus according to claim 6, further comprising:

a storage unit configured to store the plurality of pieces of frame data; and an output control unit configured to control an output of the stored plurality of pieces of frame data to the encoding unit.

14. The encoding apparatus according to claim 13, wherein the transmission unit is further configured to transmit the plurality of pieces of encoded data, and the output control unit is further configured to delete, from the storage unit, the plurality of pieces of frame data that corresponds to the transmitted plurality of pieces of encoded data.

15. An encoding method, comprising:

assigning identification information to each of a plurality of pieces of frame data;

initially encoding each of the plurality of pieces of frame data to generate a plurality of pieces of encoded data;

detecting the identification information corresponding to a set of the plurality of pieces of encoded data;

detecting, based on the identification information, at least one piece of the plurality of pieces of encoded data, wherein the set of the plurality of pieces of encoded data is regenerated;

setting a specific bit rate based on a size of a transmission packet of the set of the plurality of pieces of encoded data; and re-encoding, based on an enabled status of a re-retransmission flag, the set of the plurality of pieces of encoded data at the specific bit rate, wherein the enabled status of the re-retransmission flag is associated with a storage size of an external apparatus, and the storage size is associated with the plurality of pieces of encoded data;

generating re-encoded data based on the re-encoded set of the plurality of pieces of encoded data;

generating transmission encoded data that includes the at least one piece of the plurality of pieces of encoded data and at least one piece of the re-encoded first set of the plurality of pieces of encoded data; and wirelessly transmitting the transmission encoded data within a transmission packet of the wireless transmission of the transmission encoded data.

* * * * *